(12) United States Patent
Mead et al.

(10) Patent No.: US 12,067,588 B2
(45) Date of Patent: Aug. 20, 2024

(54) SYSTEM AND METHOD FOR INTELLIGENT DISCOUNT DISTRIBUTION BASED ON SUBSCRIBER TIER

(71) Applicants: James Mead, Las Vegas, NV (US); Pennie Mead, Las Vegas, NV (US)

(72) Inventors: James Mead, Las Vegas, NV (US); Pennie Mead, Las Vegas, NV (US)

(*) Notice: Subject to any disclaimer, the term of this patent is extended or adjusted under 35 U.S.C. 154(b) by 0 days.

(21) Appl. No.: 17/752,811

(22) Filed: May 24, 2022

(65) Prior Publication Data
US 2022/0284463 A1   Sep. 8, 2022

Related U.S. Application Data

(63) Continuation-in-part of application No. 17/409,762, filed on Aug. 23, 2021, now abandoned, which is a continuation of application No. 16/586,954, filed on Sep. 28, 2019, now Pat. No. 11,100,525, which is a continuation of application No. 15/355,004, filed on Nov. 17, 2016, now Pat. No. 10,467,644.

(60) Provisional application No. 62/264,304, filed on Dec. 7, 2015.

(51) Int. Cl.
*G06Q 30/0207* (2023.01)
*G06Q 30/0601* (2023.01)

(52) U.S. Cl.
CPC ..... *G06Q 30/0222* (2013.01); *G06Q 30/0239* (2013.01); *G06Q 30/0633* (2013.01)

(58) Field of Classification Search
CPC .......... G06Q 30/0222; G06Q 30/0239; G06Q 30/0633

USPC ................................. 705/14.23, 28
See application file for complete search history.

(56) References Cited

U.S. PATENT DOCUMENTS

| | | |
|---|---|---|
| 2010/0280960 A1 | 11/2010 | Ziotopoulos et al. |
| 2011/0082734 A1* | 4/2011 | Zhang ............ G06Q 10/087 705/28 |
| 2012/0226573 A1 | 9/2012 | Zakas et al. |
| 2012/0245988 A1 | 9/2012 | Pace et al. |
| 2013/0066740 A1 | 3/2013 | Ouimet et al. |

(Continued)

FOREIGN PATENT DOCUMENTS

JP   2003067850 A   3/2003

OTHER PUBLICATIONS

MiladyPro, Discounting or Bundling Services 101, 2014 (Year: 2014).*

(Continued)

*Primary Examiner* — Tarek Elchanti

(57) ABSTRACT

A system and method for operating a bundle-type checkout system incorporating subscription tiers, comprising an offer manager that receives price offer values from consumers, a discount optimization manager that calculates a least acceptable offer value based on offer pattern data associated to each product identifier of the bundle, calculates a total available discount for the bundle based on the least acceptable offer value and retail prices of each product identifier of the bundle, calculates price discount thresholds and compares price discount values to offer values to calculate price discounts and determines acceptability of the price offer values, and weighted discount distribution among subscription tiers to calculate a final price for each product identifier.

20 Claims, 12 Drawing Sheets

(56) References Cited

U.S. PATENT DOCUMENTS

2020/0027110 A1    1/2020   Mead et al.
2021/0383421 A1   12/2021   Mead et al.

OTHER PUBLICATIONS

Chesler et al, "Tier-Based Pricing for Institutions: A New, E-Based Pricing Model," 2009 (Year: 2009).
United States Patent and Trademark Office, U.S. Appl. No. 15/355,004, Non-Final Office Action dated Oct. 29, 2018.
United States Patent and Trademark Office, U.S. Appl. No. 15/355,004, Notice of Allowance dated Sep. 24, 2019.
United States Patent and Trademark Office, U.S. Appl. No. 16/586,954, Non-Final Office Action dated Sep. 8, 2020.
United States Patent and Trademark Office, U.S. Appl. No. 16/586,954, Notice of Allowance dated Apr. 20, 2021.
United States Patent and Trademark Office, U.S. Appl. No. 17/409,762, Non-Final Office Action dated Jul. 1, 2022.
Zuora Content Team, "9 Keys to Building Successful Subscription Business Models", 2014 (Year: 2014).

* cited by examiner

| Items | Qt. | Suggested retail | Avg. order price | Enter the price you want to pay | Remarks |
|---|---|---|---|---|---|
| 801 — Tagcadey- .... | 1 | 129.10 | 128.10 | ∨ | 0 |
| 802 — .......... | 1 | ........ | ........ | ∨ | 0 |
| 803 — .......... | 1 | ........ | ........ | ∨ | 0 |
| ............ Sub-totals | 3 | ........ | ........ | My............ 608.00 — 810 | |

MY SHOPPING CART- What Do YOU Want to Pay? Make Your Offer Below... — 800

Customers.... | Update | Back to standard cart

Need source help

Exceed your price ok. Let's go
↓
PREVIEW MY DEAL — 820

FIG. 8

SYSTEM AND METHOD FOR INTELLIGENT DISCOUNT DISTRIBUTION BASED ON SUBSCRIBER TIER

CROSS-REFERENCE TO RELATED APPLICATIONS

This application is a continuation-in-part of U.S. Non-provisional patent application Ser. No. 17/409,762, filed Aug. 23, 2021, entitled "SYSTEM AND METHOD FOR INTELLIGENT DISCOUNT DISTRIBUTION BASED ON SUBSCRIBER TIER," which claims priority to U.S. Non-provisional patent application Ser. No. 16/586,954, filed Sep. 28, 2019, entitled "SYSTEM AND METHOD FOR INTELLIGENT DISCOUNT DISTRIBUTION BASED ON SUBSCRIBER TIER," which claims priority to U.S. Non-provisional patent application Ser. No. 15/355,004, filed Nov. 17, 2016, now U.S. Pat. No. 10,467,644B2 entitled "SYSTEM AND METHOD FOR INTELLIGENT DISCOUNT DISTRIBUTION BASED ON SUBSCRIBER TIER," which further claims the benefit of priority to U.S. Provisional Application No. 62/264,304, filed Dec. 7, 2015, entitled "SYSTEM AND METHOD FOR INTELLIGENT DISCOUNT DISTRIBUTION BASED ON SUBSCRIBER TIER" the entire contents of which are herein incorporated by reference.

TECHNICAL FIELD

Embodiments relate generally to computer systems, and, more specifically, to a computer system with a memory unit having a catastrophic event backup system.

BACKGROUND OF THE INVENTION

The disclosure relates to the field of, and more particularly to the field of distributing weighted discount to merchants based on subscription tier in a bundled checkout scenario.

In the art of electronically purchasing products, it is common to allow consumer to place an offer on items rather than pay a fixed price (for example, online product portal such as Amazon.com™, AliBaba™, AliExpress™). In such arrangements, buyers typically submit a "best offer" for an item that may have a fixed price, rather than paying the listed price. In such an arrangement, a merchant would then review offers either manually or automatically, and select buyers with whom to complete a sale. There is currently no platform for potential buyers to submit a number of offer values on items from a plurality of merchants, using bundle-type pricing to make an offer on a group of items in an electronic shopping cart, and no means exist for merchants to easily configure bundle-type pricing or offer-acceptance rules for their stock. Furthermore, there is distinction between merchants. For example, merchants that may sell a high volume of products do not have creative ways to reduce discount in a bundle-type product arrangement.

What is needed, is a means to enable buyers to easily submit a price offer on multiple items, and for merchants to easily compare a received offer against configured discount and bundle thresholds to determine an optimum arrangement for an offer to maximize profit while appealing to buyers through discounted pricing. Further, what is needed is a means to distinguish between different service levels or discounts applied to different tier merchants based on subscription tier.

SUMMARY OF THE INVENTION

Accordingly, the inventor has conceived and reduced to practice, in an embodiment of the invention, a system and methods for operating a checkout system incorporating bundle-type offer acceptance with subscription tiers for merchants to enable a weighted discount scenario to increase revenue of product sales.

According to an embodiment of the invention, a bundle-type checkout system comprising an offer manager configured to receive a bundle of product identifiers and a price offer value for the bundle, a discount optimization manager configured to calculate a least acceptable offer price for each product identifier in the bundle, calculate a total available discount for the bundle based on a difference between the least acceptable offer price for each product identifier and a corresponding retail price for each product identifier in the bundle, calculate a requested discount for the bundle based on a difference between a total retail price for the bundle and the price offer value, wherein the total retail price is the sum of all of the corresponding retail price associated with each product identifier in the bundle, calculate a weighted discount value for each product identifier in the bundle based on a subscription tier associated with a merchant user device and the product identifier, calculate a final sale price for each product identifier in the bundle based on the weighted discount value, and transmit the final sale price for each product identifier to an associated merchant user device based on a corresponding merchant device identifier is disclosed.

According to another embodiment of the invention, a system, comprising a network-connected bundle-type checkout computer comprising a plurality of programming instructions stored in a memory and operating on a processor, the programming instructions configured to operate a bundle-type checkout system comprising: an offer manager configured to: receive, from a consumer device, a subset of a plurality of product identifiers as a bundle and a price offer value for the bundle; a discount optimization manager to: calculate a least acceptable offer price associated to each product identifier of the subset of the plurality of product identifiers in the bundle, wherein the least acceptable offer price is determined based on offer pattern data, and wherein the offer pattern data corresponds to a pattern derived from analyzed historical data comprising historical sales information for the plurality of product identifiers, historical bundle offer information for the bundle, information of a plurality of subscription values of a plurality of merchant device identifiers associated to a plurality of merchant user devices; calculate a total available discount for the bundle based at least in part on: the least acceptable offer price associated to each product identifier in the bundle, and a corresponding retail price associated to each product identifier in the bundle; calculate a requested discount for the bundle based at least in part on a total retail price for the bundle and the price offer value, wherein the total retail price for the bundle is the sum of the corresponding retail price associated to each product identifier in the bundle; calculate a weighted discount matrix based on the requested discount being less than the available discount for the bundle, wherein the weighted discount matrix holds a plurality of weighted discount values based at least in part on a plurality of subscription values, and wherein each weighted discount value of the plurality of weighted discount values corresponds to an associated subscription tier for each merchant user device associated to each product identifier within the bundle; assign a weighted discount value, from the plurality of weighted discount values, for each product identifier within the bundle; calculate a final sale price for each product identifier within the bundle based at least in part on the weighted discount value; and transmit the final sale price, for each product identifier to an associated merchant user device of the plurality of merchant user devices, based on a corresponding merchant device identifier of the plurality of merchant device identifiers, is disclosed.

According to another embodiment of the invention, a computer-implemented method, comprising: receiving, from a consumer device at an offer manager, a subset of a plurality of product identifiers as a bundle and a price offer value for the bundle; calculating, at a discount optimization manager, a least acceptable offer value associated to each product identifier of the subset of the plurality of product identifiers in the bundle, wherein the least acceptable offer value is determined based on offer pattern data, and wherein the offer pattern data corresponds to a pattern derived from analyzed historical data comprising historical sales information for the plurality of product identifiers, historical bundle offer information for the bundle, information of a plurality of subscription values of a plurality of merchant device identifiers associated to a plurality of merchant user devices; calculating, at the discount optimization manager, a total available discount for the bundle based at least in part on: the least acceptable offer value associated to each product identifier in the bundle, and a corresponding retail price associated to each product identifier in the bundle; calculating, at the discount optimization manager, a requested discount for the bundle based at least in part on a total retail bundle price for the bundle and the price offer value for the bundle, wherein the total retail price for the bundle is a sum of the corresponding retail price associated to each product identifier in the bundle; calculating, at the discount optimization manager, a weighted discount matrix based on the requested discount being less than the total available discount for the bundle, wherein the weighted discount matrix holds a plurality of weighted discount values based at least in part on the plurality of subscription values, and wherein each weighted discount value of the plurality of weighted discount values corresponds to an associated subscription tier for each merchant user device associated to each product identifier within the bundle; assigning, at the discount optimization manager, a weighted discount value from the plurality of weighted discount values for each product identifier within the bundle; calculating, at the discount optimization manager, a final sale price for each product identifier within the bundle based at least in part on the weighted discount value; and transmitting the final sale price, for each product identifier to an associated merchant user device of the plurality of merchant user devices, based on a corresponding merchant device identifier of the plurality of merchant device identifiers, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 8 is an illustration of an exemplary graphical user interface for a bundle-type shopping cart incorporating product bundles, illustrating the use of bundled price offers.

DETAILED DESCRIPTION

Figure 1:
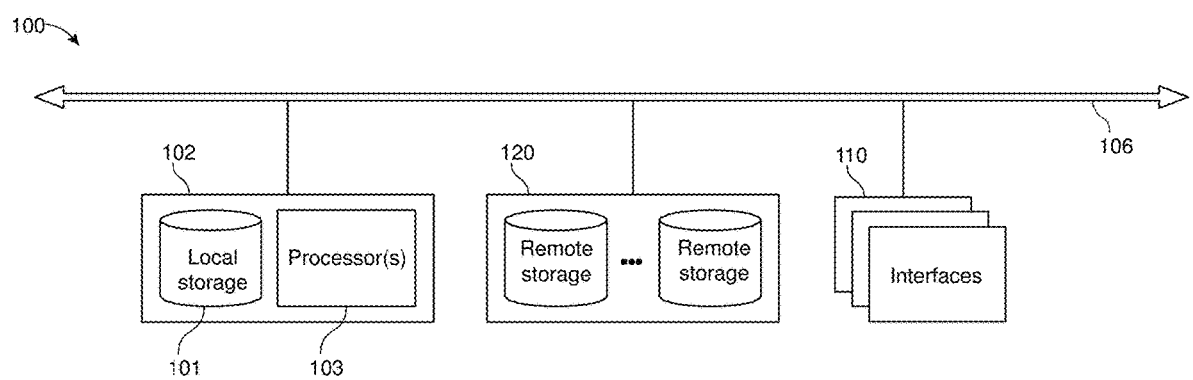
FIG. 1 is a block diagram illustrating an exemplary hardware architecture of a computing device used in an embodiment of the invention.

The inventor has conceived, and reduced to practice, in an embodiment of the invention, a system and methods for operating a checkout system incorporating bundle-type offers with weighted discount distribution based on merchant subscription level.

One or more different inventions may be described in the present application. Further, for one or more of the inventions described herein, numerous alternative embodiments may be described, it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in each embodiment or occurrence.

When a single device or article is described herein, it will be clear that more than one device or article may be used in place of a single device or article. Similarly, where more than one device or article is described herein, it will be clear that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. The computing device 100 may be, for example, any one of the computing machines listed in the previous paragraph, or indeed any other electronic device capable of executing software- or hardware-based instructions according to one or more programs stored in memory. The computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, the computing device 100 includes one or more central processing units (CPU) 102, one or more interfaces 110, and one or more buses 106 (such as a peripheral component interconnect (PCI) bus). When acting under the control of appropriate software or firmware, the CPU 102 may be responsible for implementing specific functions associated with the functions of a specifically configured computing device or machine. For example, in at least one embodiment, the computing device 100 may be configured or designed to function as a server system utilizing the CPU 102, local memory 101 and/or remote Memory 120, and interface(s) 110. In at least one embodiment, the CPU 102 may be caused to perform one or more of the different types of functions and/or operations under the control of software modules or components, which for example, may include an operating system and any appropriate applications software, drivers, and the like.

The CPU 102 may include the one or more processors 103 such as, for example, a processor from one of the Intel, ARM, Qualcomm, and AMD families of microprocessors. In some embodiments, the one or more processors 103 may include specially designed hardware such as application-specific integrated circuits (ASICs), electrically erasable programmable read-only memories (EEPROMs), field-programmable gate arrays (FPGAs), and so forth, for controlling operations of the computing device 100. In a specific embodiment, the local memory 101 (such as non-volatile random access memory (RAM) and/or read-only memory (ROM), including for example one or more levels of cached memory) may also form part of the CPU 102. However, there are many different ways in which memory may be coupled to the computing device 100. The local memory 101 may be used for a variety of purposes such as, for example, caching and/or storing data, programming instructions, and the like. It should be further appreciated that the CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, the NICs control the sending and receiving of data packets over a computer network, other types of interfaces 110 may for example support other peripherals used with the computing device 100. Among the interfaces 110 that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

The system shown in FIG. 1 illustrates one embodiment for a computing device 100 for implementing one or more of the systems described herein, it is by no means the only device architecture on which at least a portion of the features and techniques described herein may be implemented. For example, architectures having one or any number of processors 103 may be used, and such the processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, the remote Memory 120 and the local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape, optical media such as CD-ROM disks, magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

In some embodiments, systems according to the present invention may be implemented on a standalone computing system.

Figure 2:
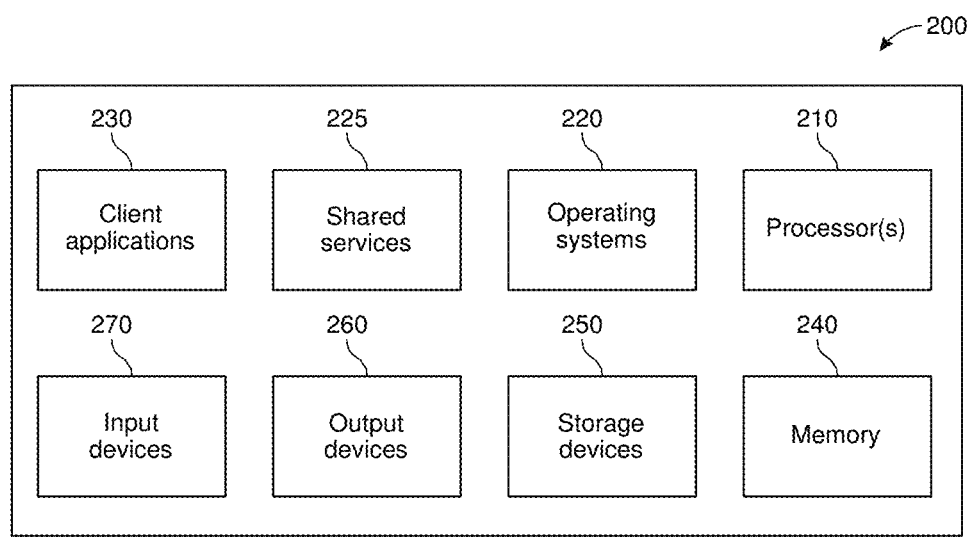
FIG. 2 is a block diagram illustrating an exemplary logical architecture for a client device, according to an embodiment of the invention.

Referring now to FIG. 2, there is shown a block diagram depicting a typical exemplary architecture of one or more embodiments or components thereof on a standalone computing system. Computing device 200 or system 200 includes processors 210 that may run software that carry out one or more functions or applications of embodiments of the invention, such as for example client applications 230. The processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in the system 200, and may be useful for providing common services to the client applications 230. Services 225 may for example be WINDOWS™ services, user-space common services in a Linux environment, or any other type of common service architecture used with the operating system 220. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to the system 200, and may include for example one or more screens for visual output, speakers, printers, or any combination thereof. Memory 240 may be random-access memory having any structure and architecture known in the art, for use by the processors 210, for example to run software. Storage devices 250 may be any magnetic, optical, mechanical, memristor, or electrical storage device for storage of data in digital form (such as those described above, referring to FIG. 1). Examples of the Storage devices 250 include flash memory, magnetic hard drive, CD-ROM, and/or the like.

In some embodiments, systems of the present invention may be implemented on a distributed computing network, such as one having any number of clients and/or servers.

Figure 3:
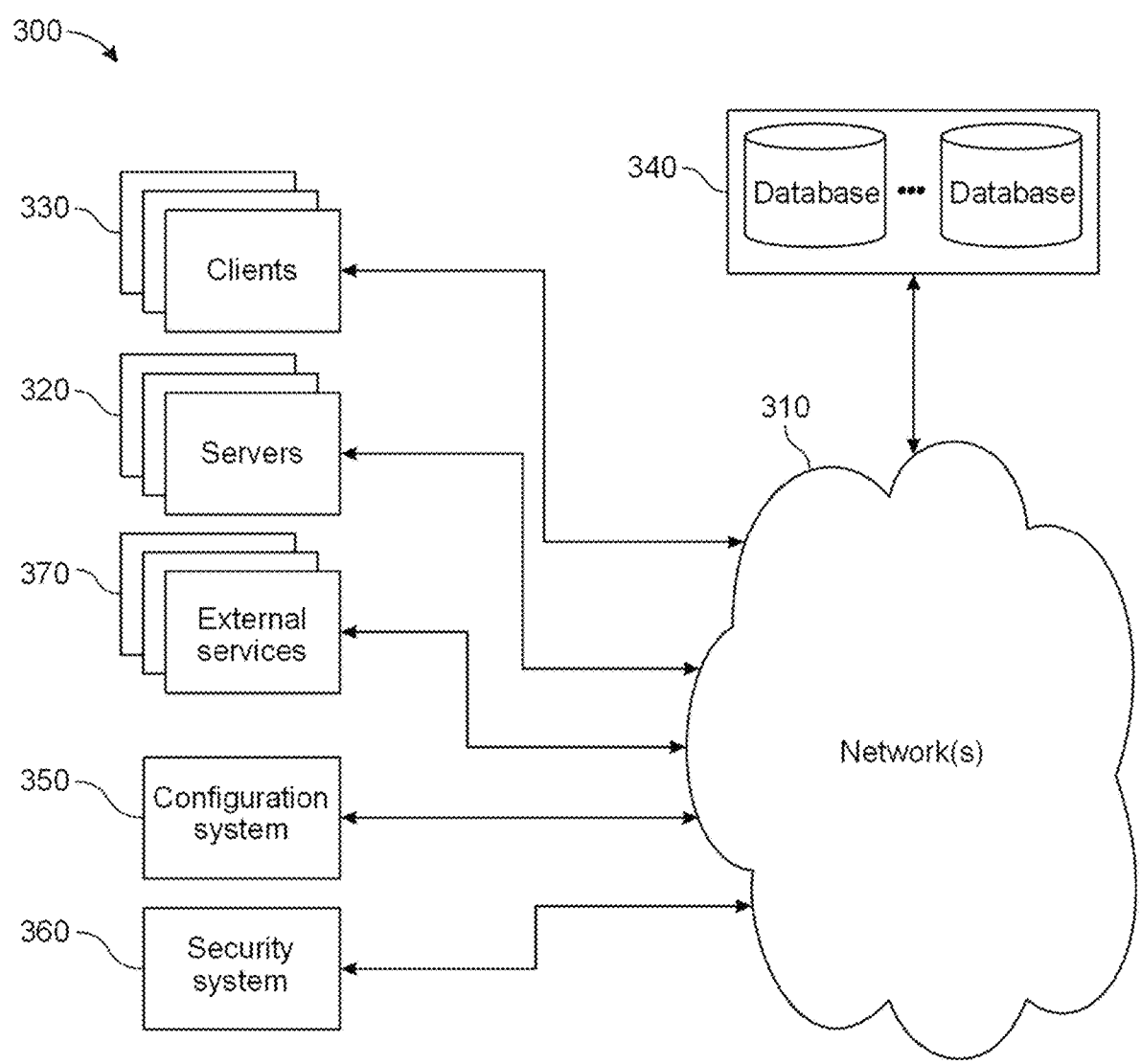
FIG. 3 is a block diagram showing an exemplary architectural arrangement of clients, servers, and external services, according to an embodiment of the invention.

Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each of the clients 330 may run software for implementing client-side portions of the present invention; the clients may comprise the system 200 such as that illustrated in FIG. 2. In addition, any number of servers 320 may be provided for handling requests received from one or more clients 330. The clients 330 and the servers 320 may communicate with one another via one or more electronic networks 310, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art, the invention does not prefer any one network topology over any other). The one or more electronic networks 310 may be implemented using any known network protocols, including for example wired and/or wireless protocols.

In addition, in some embodiments, the servers 320 may call external services 370 when needed to obtain additional information, or to refer to additional data concerning a particular call. Communications with the external services 370 may take place, for example, via the one or more electronic networks 310. In various embodiments, the external services 370 may comprise web-enabled services or functionality related to or installed on the hardware device itself. For example, in an embodiment where the client applications 230 are implemented on a smartphone or other electronic device, the client applications 230 may obtain information stored in a server system of one of the servers 320 in the cloud or on an external service 370 deployed on one or more of a particular enterprise's or user's premises.

In some embodiments of the invention, the clients 330 or servers 320 (or both) may make use of one or more specialized services or appliances that may be deployed locally or remotely across the one or more electronic networks 310. For example, one or more databases 340 may be used or referred to by one or more embodiments of the invention. In other embodiments, one or more databases 340 may be arranged in a wide variety of architectures and using a wide variety of data access and manipulation means. For example, in various embodiments, the one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. Different configuration or security subsystems known in the art now or in the future may be used in conjunction with embodiments of the invention without limitation, unless a specific security of the one or more security systems 360 or configuration systems 350 or approach is specifically required by the description of any specific embodiment.

Figure 4:
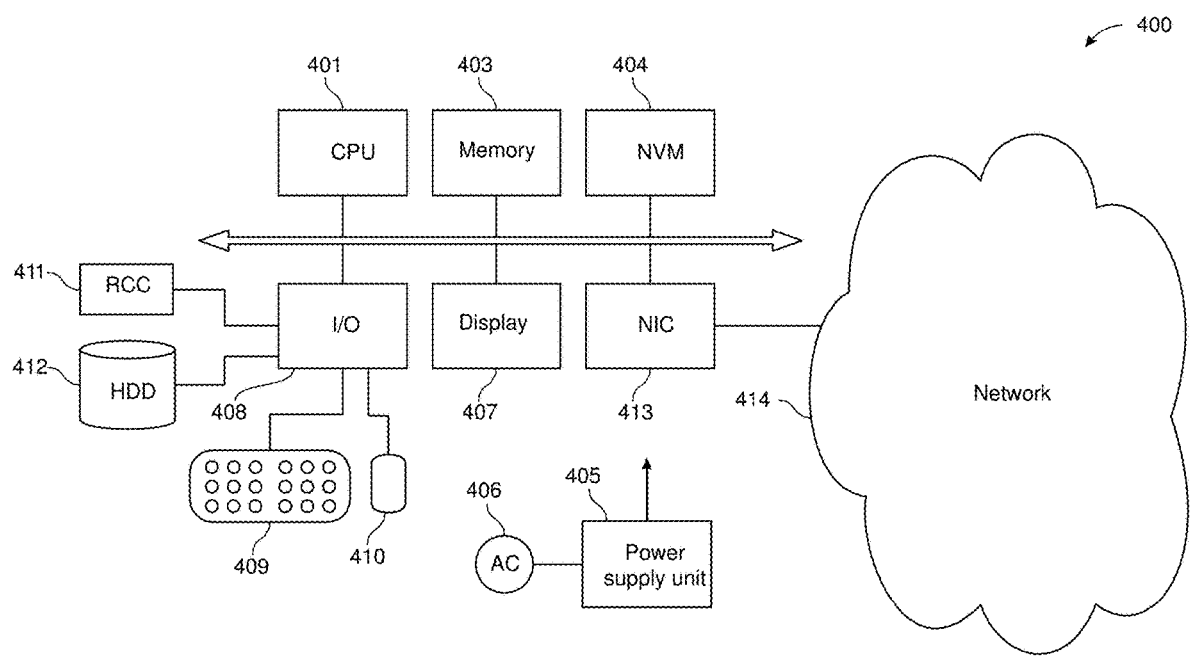
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to the computer system 400 (or the system 400) without departing from the broader spirit and scope of the system and method disclosed herein. CPU 401 is connected to bus 402, to which the bus 402 is also connected memory 403, nonvolatile memory 404, display 407, I/O unit 408, and network interface card (NIC) 413. The I/O unit 408 may, typically, be connected to keyboard 409, pointing device 410, hard disk 412, and real-time clock 411. The NIC 413 connects to network 414, which may be the Internet or a local network, which local network may or may not have connections to the Internet. Also, shown as part of the system 400 is power supply unit 405 connected, in this example, to AC supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5A:
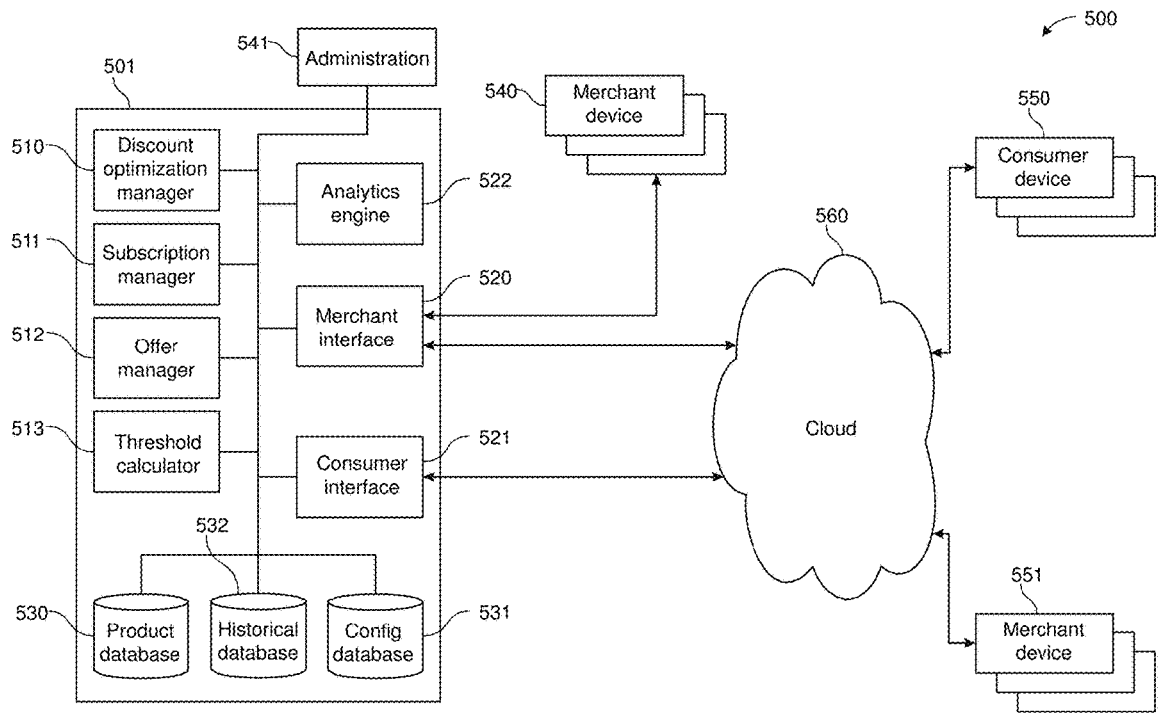
FIG. 5A is a block diagram of an exemplary system architecture for operating a bundle-type checkout system incorporating subscription tiers, according to an embodiment of the invention.

FIG. 5A is a block diagram of an exemplary system architecture 500 for operating a bundle-type checkout system 501 incorporating subscription tiers 536, according to an embodiment of the invention. According to the embodiment, the bundle-type checkout system 501 (also called as a checkout system 501) in communication with a plurality of client interfaces operating on a network (for example, a packet switched network, the internet, local area network (LAN), wide area network (WAN), or the like) such as a merchant interface 520 and a consumer interface 521, that may each comprise a plurality of programming instructions 502, such as a software 504, stored in a memory 101 and operating on a processor 103 of a network-connected computing device, and may be configured to communicate via a network 560 such as the Internet or other data communication network. For example, merchant interface 520 may be configured to communicate via a cloud-based protocol to receive interactions from a plurality of merchant devices 551 via a network 560, such as to enable merchants 574 to interact with the checkout system 501 via a web browser, another software application, or a specially programmed user computer, for example to configure operation of a particular checkout arrangement (such as an electronic storefront for a particular merchant), or to communicate with a plurality of merchant devices 540 via a local network connection such as a LAN operated by the merchant 574, or an internal data network operating on a merchant device. In some embodiments, merchant interface 520 assigns a merchant device identifier 568 to, for example the merchants 574 registering with the checkout system 501 or interchangeably referred to hereinafter a system 501. In some embodiment, the merchant interface 520 may receive, from a plurality of merchant devices 540, a plurality of product identifiers 542 corresponding to products that the merchant 574 may have for sale. The consumer interface 521 may be configured to communicate via a network 560 with a plurality of consumer devices 550, for example via a software application operating on a plurality of consumer devices 550 or, for example, a plurality of specially programmed consumer computer 550. In some embodiments, consumers may communicate with the system 501 via a web interface accessible via a browser application. In other embodiments, each bundle 544 can include subsets of the product identifiers 542 from a plurality of the merchants 574. Thus, the bundle 544 can be an order associated with multiple products from multiple merchants 574. This can include providing product shipping from a plurality of the shipping addresses of the merchants 574 for different subsets of the product identifiers 542.

The product identifiers 542 can be used to describe physical products, but the product identifiers 542 can also identify non-physical products such as enhanced warranties, shipping options, associated accounts or user identifications, or other similar items. The product identifiers 542 can identify other non-physical products such as services including insurance, consulting, financial instruments, or other non-physical and intangible products and services. The product identifiers 542 can be associated with insurance policies, financial instruments, utility services, access services, entertainment services, mechanical services, electrical services, technical services, or other types of services. The bundle 544 can include a combination of products and services.

According to another embodiment, the checkout system 501 may further comprise a plurality of data storage, for example a product database 530 that may be configured to store the product identifiers 542 and provide information pertaining to products such as pricing or inventory information, or a configuration (config) database 531 that may be configured to store and provide configuration information for operating a bundle-type checkout system 501, such as merchant-specific pricing thresholds (as described below), and merchant subscription tiers. Historical database 532 may be configured to store (i) historical sales information 554 outlining individual offer and sales information for a plurality of the product identifiers 542 for completed sales in a bundle-type offer scenario, (ii) historical bundle offer information 556 and sales information for a plurality of bundles 544, (iii) unsuccessful offers by a plurality of consumer devices 550, (iv) the product identifiers 542 by subscription tier (v) common bundle arrangements by the plurality of consumer devices 550, (vi) and the like. It can be appreciated by one with ordinary skill in the art that, in an embodiment, any and all transaction in system 501 may be stored in historical database 532. Administration interface 541 (also interchangeably referred to admin console) provides an interface for the operator of system 501 to configure manage system 501, including but not limited to, configuring the plurality of merchant devices 551 and the plurality of consumer devices 550, configuring the subscription tiers 536, analyzing historical sales and bundle information, setting thresholds, and other system configurations.

Analytics engine 522 may provide a mechanism to analyze the historical data to perform analysis on the historical sales, bundles, retail price to discounted price deviations, and the like. In some example embodiments, the Analytics engine 522 may be an artificial intelligence based (AI) engine that may analyze the historical data and derive or detect a pattern 572, such as a pricing pattern 548, from an analyzed historical data 552. The pattern 572 may correspond to behavioral pattern of product sales, product purchase, and/or the like. For instance, the Analytics engine 522 analyzes historical sales performance in the historical data and derives the pattern 572 corresponding to the sales. The AI based analytics engine is described in detail with reference to FIG. 5B.

In some embodiments, the Analytics engine 522 may provide the "what-if" scenarios to recalculate product sales if the merchants 574 were of different subscription tiers to forecast sales differentials for the subscription tiers 536 for non-subscribing merchants, or a higher subscription tiers for lower subscribing merchants (for example where a higher subscription tier would enjoy a lesser discount on the merchant's products when possible).

The System 501 may further comprise a plurality of programming instructions configured to operate specific functions of the system 501, such as including, for example, according to an embodiment, a discount optimization manager 510 that may calculate merchant discounts according to configured parameters based on, for example, a merchant's subscription tier, in order to optimize a match with a plurality of consumer offer values.

The discount optimization manager 510 may calculate an available discount 566, and compare it to a requested discount 564 to determine, for example, whether or not to accept an offer. In some embodiments, the discount optimization manager 510 may create a weighted discount matrix 534 also interchangeably referred to as weighted discount distribution matrix (as described in FIG. 10) to weight discounts provided to subscription tier of the merchant devices 551.

A subscription manager 511 may configure membership levels or "subscription tiers" for the merchants 574 and define configuration parameters related to merchant tiers (such as default discount configuration, subscription-tier discount configuration, and the like). Administration interface 541 may configure any number of the subscription tiers 536 via subscription manager 511. In some embodiments, the subscription tiers 536 may be dynamically created by discount optimization manager 510 based on historical product sales information, to optimize the subscription tiers 536 to maximize revenue for the merchants 574 and/or maximize revenue for the operator of the system 501.

An offer manager 512 may receive and manage bundle-type pricing offer values from consumers for comparison, or a threshold calculator 513 may calculate comparisons between merchant discount values and consumer offer values to determine suitability or allocation of funds after a purchase is made, for example according to allocation rules set by a subscription manager, such as the subscription manager 511.

In some other embodiments, the Administration interface 541 may be used to configure the system 501 and configuration stored in the config database 531. The configuration may include, but not limited to, setting the subscription tiers 536 and associated discounts (as described in FIG. 10), configuring the merchants 574, and other system configurations. Such functions are described in greater detail below, referring to FIGS. 6-10.

Figure 5B:
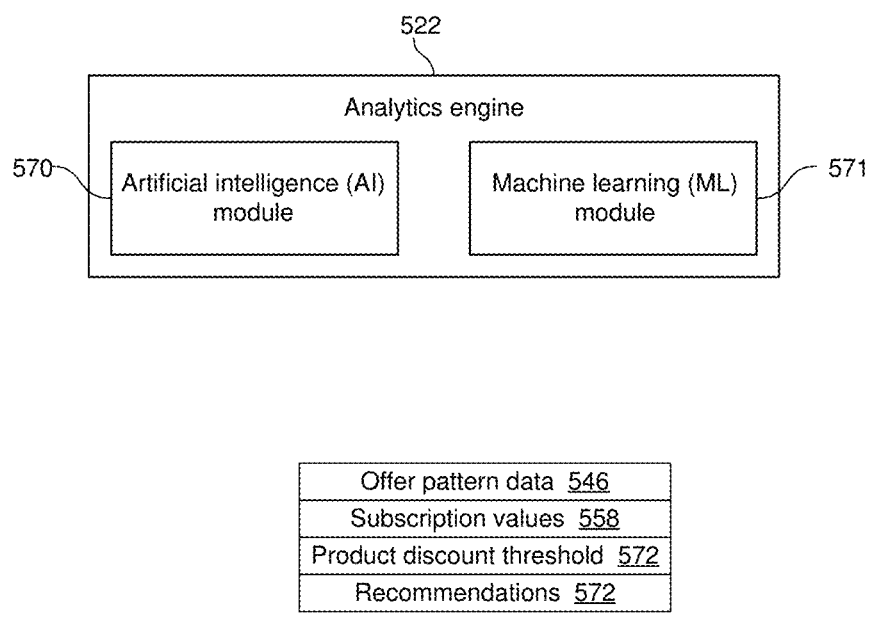
FIG. 5B is a block diagram of an analytics engine of the system of FIG. 5A, according to an embodiment of the invention.

FIG. 5B is a block diagram of the Analytics engine 522, according to an embodiment of the invention. In some embodiments, the Analytics engine 522 may use Artificial Intelligence (AI) techniques in combination with Machine Learning (ML) techniques for providing an intelligent discount distribution based on a subscriber tier. The ML techniques help in learning process in an automated manner, without much intervention of human. The AI techniques may be used to analyze historical data and other information stored in a plurality of data storage, e.g., the product database 530, the configuration database 531 and the historical database 532. The other information may include a plurality of subscription values 558, a plurality of merchant device identifiers 562 associated with a plurality of merchant user devices (for example, the plurality of merchant devices 551 and the plurality of merchant devices 540), a plurality of the product identifiers 542, a plurality of selected product identifiers (i.e., a bundle 544), and a product discount threshold 568 for the bundle. The implementation of AI/ML techniques for the intelligent discount distribution in the single device or article described herein may compute massive amounts of data in fast, automated and efficient manner, without human intervention. The computation of massive amounts of data using the AI/ML techniques provides advanced analytics of the data, while achieving an accurate output.

In some example embodiments, the Analytics engine 522 includes an artificial intelligence (AI) module 570 and a machine learning (ML) module 571. The AI module 570 is configured to analyze the historical data items stored in the product database 530, the configuration database 531 and the historical database 532. The AI module 570 may analyze the historical data using deterministic algorithm, stochastic algorithm or combination thereof, such as, Bayesian network, neural network, fuzzy logic, and the like. The analyzed historical data 552 may be provided to the ML module 571. The ML module 571 is configured to derive, detect, or learn the pattern 572 from the analyzed historical data 552. The pattern 572 may be derived based on one or more ML models of the ML module 571. The one or more ML models may include, but not limited to, a Convolutional Neural Network (CNN) model, a Hidden Markov Model (HMM), or a Recurrent Neural Network (RNN) model. In particular, the one or more ML models may learn the pattern 572 based on pattern recognition algorithms. The pattern recognition algorithms may help in identifying behavior and trends of purchase and sales of products from the analyzed historical data 552. The figures show a single analytics engine 522 having a single AI module 570 and a single ML module 571 and other configurations are possible. The analytics engine 522 can include multiple hardware units and be distributed between the merchant devices and the consumer devices. Similarly, the AI module 570 and the ML module 571 can be implemented as a single unit or as a distributed system spread across the merchant devices, the consumer devices, and other network-accessible compute units. The identified behavior and trends of the purchase and sales of products may be used for prediction of desired outcome, such as increasing product sales for merchants, identifying potential customers for purchase of products, or the like. The pattern recognition algorithms may include classification methods, clustering methods, ensemble learning methods, multi-linear space learning methods, regression methods, labeling methods or the like. The pattern 572 derived can be calculated by identifying a price for a product identifier including the most commonly used price, a median price, an average price, a time-based price, location-based price, a coupon price, a pre-defined price, a demand-based price, or other similar pricing mechanisms. The pattern 572 derived can be for a set of physical products, a set of services, or a combination thereof.

In one example embodiment, the AI module 570 may analyze historical revenue performance and product sales of the merchants 574 by processing information from the historical database 532. The analyzed product sales and the historical revenue performance of the merchants 574 may be provided to the ML module 571. The ML module 571 may learn a pattern related to product sales of the merchants 574 based on the analyzed product sales and the analyzed historical revenue performance for predicting outcome of futures sales with maximum gain. The pattern may be used as offer pattern data 546 by the Analytics engine 522 for calculating a dynamic subscription price. The Analytics engine 522 may recommend a subscription value for the merchant 574 based on the calculated dynamic subscription price. The subscription value may provide benefits to sales through a subscription tier associated with the recommended subscription value. The benefits of sales may entice the subscription tiers 536 to the merchant 574 to have maximum gain in the sales. In some cases, the merchant 574 may have a subscription tier of lower level, for example, "a silver tier". In such cases, the merchant 574 may be enticed to a subscription tier of higher level, for example, "a gold tier" based on the calculated subscription value. In some embodiments, the analyzed historical data 522 can include individual sales pricing, combination sales pricing, volume pricing, product age pricing, service pricing, combination pricing, up-selling pricing, cross-selling pricing, or other similar pricing data.

In some cases, the merchant 574 may not have a subscription tier. In such cases, a subscription value may be computed for the non-subscribing merchant based on the offer pattern data 546 and recommend a suitable subscription tier for the corresponding merchant. In some other example embodiments, the Analytics engine 522 may simulate what-if scenarios for enticing the subscription tiers 536 to the merchants using the ML module 571. The product sales may be recalculated for the merchants with different subscription tiers 536 based on the what-if scenarios. The recalculated product sales may be used to forecast sales for different subscription tiers for non-subscribing merchants, or for merchant with lower subscription tiers.

In some scenarios, consumers may add products in a shopping cart and later abandon the products in the shopping cart. Such consumers may be determined based on the pricing pattern 548 of purchase behavior of the consumers. To that end, the Analytics engine 522 may analyze purchase behavior of consumers using the AI module 570. The ML module 571 may learn a purchase pattern from the analyzed purchase behavior. The purchase pattern may be used to determine potential consumers that will purchase products from the merchants. Further, the Analytics engine 522 may suggest recommendations 576 to the consumers by simulating what-if scenarios. The recommendations 576 may include pricing offers to be negotiated to the merchants 574, alternative products (of same merchants or different merchants) similar to abandoned products, and/or the like. The recommendation 576 of pricing offers or alternative products retains the consumers to engage more time in purchasing as well as reduces occurrences of the shopping cart abandonment. The products in an electronic shopping cart may be used to form the bundle.

DETAILED DESCRIPTION OF EXEMPLARY EMBODIMENTS

Figure 6:
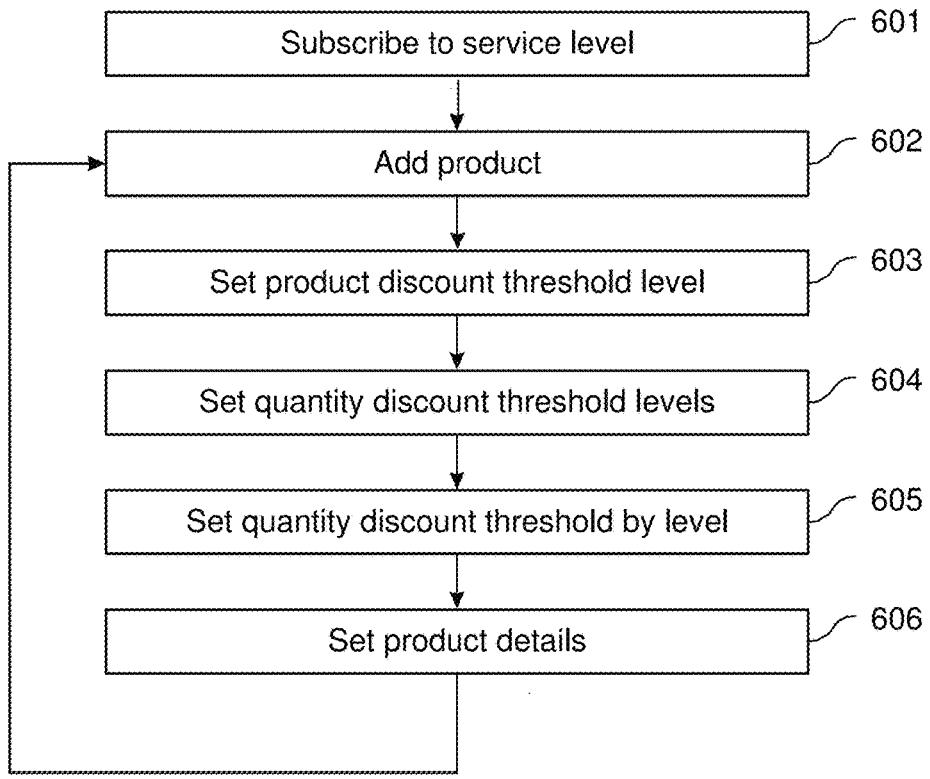
FIG. 6 is a flow diagram illustrating an exemplary method for operating a bundle-type checkout system incorporating subscription tiers, from the perspective of a participating merchant.

FIG. 6 is a flow diagram illustrating an exemplary method 600 for operating a bundle-type checkout system incorporating the subscription tiers 536, from the perspective of merchant device 551. According to the embodiment, a merchant may elect, via merchant device 551, to participate in a bundle-type checkout system 501 incorporating the subscription tiers 536, and may configure the particular nature of such a system to suit their preference according to the embodiment.

In an initial step 601, a merchant may subscribe to a service level, or "subscription tier". Service levels may be used to define pre-configured operation parameters, such as default pricing discount rules 616 and algorithms used in comparing discounts to consumer offer values. In some example embodiments, the pricing discount rules 616 may be determined by the discount optimization manager 510, based on the pattern derived from the analyzed historical data 552 in the plurality of data storage (e.g., the product database 530, the configuration database 531 and the historical database 532). Such pricing discount rules 616 are dynamic rules, which are calculated based on the pattern analyzed from the historical data, for comparing the discounts to the consumer offer values. For example, a merchant subscribed to a "gold tier" may be entitled to a higher portion of a consumer's purchase price (based upon a consumer offers a higher price than the discount level set for a product identifier and/or bundle), whereas a merchant subscribed to a "bronze tier" may be entitled to a smaller portion or lower allocation priority (that is, they may only receive funds if there is a remaining surplus after first allocating to higher-tier merchants). In some embodiments, there is a non-subscriber tier 618, where full discounts will be offered before any discount is associated to the product identifiers 542 associated to subscriber tier merchant identifiers. In some other embodiments, the pricing pattern 548 can be derived or calculated based on popular pricing points, time-based historical prices, location-based prices, combination product prices, holiday pricing, regional pricing, national prices, product combination prices, AI pattern detection, ML pattern detection, or other similar pricing techniques and methodologies. In some embodiments, the subscription tier may be assigned temporarily or for an individual sales based on the implementation of one of the pricing or discount rules. Such temporary access to the subscription tier, or a temporary subscription tier, can be used as part of a special offer to encourage the completion of the sale. It is understood that pricing and the subscription tier may be assigned on the basis of the product identifier indicating a product or a service. Further, the pricing rules may be different for products and services. The pricing rules for products can be modified by the presence of services in the bundle.

In a next step 602, a merchant via a first merchant device 551 may add a product identifier to their online storefront inventory, making the associated product available for purchase by a plurality of consumers via identifying the associated product identifier via the plurality of consumer devices 550. The product identifier may refer to a product or a service.

In a next step 603, the first merchant device 551 may set a product discount threshold 568 for use in comparing against the plurality of offer values received from the plurality of consumer devices 550 (for example, by a threshold calculator described above, referring to FIG. 5A), such as by using a preconfigured or default level set by their service level, or by specifying a discount of their choosing. For example, the merchant device 551 may designate to accept "up to 20% off" on a particular item, specifying that any consumer offers meeting at least 80% of the product's initial price value may be accepted via the first merchant device 551. In some example embodiments, the product discount threshold 568 may be set based on the pricing pattern 548 from analysis of the historical data (e.g., product sales of merchants) in the product database 530, the configuration database 531, and the historical database 532. For instance, the pricing pattern 548 may provide a value corresponding to at least a range of offer values provided by consumers for a specific product, a common range of offer values provided by a specific consumer for products of a merchant or offer values provided by the specific consumer for products from multiple merchants.

In some embodiments, the merchant may establish, via the first merchant device 551, a lowest acceptable offer or a least acceptable offer (LAO) 610 (hereinafter referred to as "LAO" or LAO price) for each individual product available for sale and associated to the corresponding product identifier. In some embodiments, the LAO 610 can be determined based on the number of items sold at one time, the physical size of the products, the shipping costs, the age of the products, the presence of services, the type of additional services, the storage costs, the purchase location, the delivery location, or other sales and pricing factors.

In this regard, threshold calculator 513 may assign a different LAO 610 based on a quantity of a particular product identifier within a bundle selected by a first consumer device 550, for example, based on predefined threshold rules configured by threshold calculator 513. In another embodiment, an LAO price 610 is calculated once a percentage discount is specified by a merchant via the first merchant device 551.

In a next step 604, the merchant, via the first merchant device 551, may set automatic quantity discount threshold levels 612, for example to specify additional quantities that may be used as "bundles" when a consumer purchases multiples of the same item, or multiple items from the same merchant (for example, "buy 5 of this item" or "buy 3 items from this seller").

In some embodiments, the LAO price 610 may be calculated by the discount optimization manager 510 based on the offer pattern data 546 that corresponds to a pattern derived from the analyzed historical data 552. The discount optimization manager 510 may obtain the analyzed historical data 552 from the Analytics engine 522. The discount optimization manager 510 may provide the calculated LAO price 610 to the first merchant device 551 via the merchant interface 520. In such embodiments, the discount threshold levels 612 may be set automatically based on analysis of information related to product sales stored in the product database 530 or the historical database 532. The information related to the product sales may be analyzed by the Analytics engine 522 for generating a product sales pattern 614 of the product sales. The product sales pattern 614 may include a value that corresponds to a range of discounts successfully offered in previous product sales, previous product combination sales, region-based sales, national sales, time- and date-based sales, AI/ML-based sales patterns, previous service sales, national service sales, regional service sales, service product volume, service locations, and other similar historical sales data. For example, a product with popular discounts ranging from 5% to 10% in the previous product sales may be derived as the product sales pattern 614. These discount range of 5%-10% may be used for setting the discount threshold levels 612. The Analytics engine 522 may provide the product sales pattern 614 to the threshold calculator 513 to set the discount threshold levels 612 in an automated manner.

In a next step 605, the merchant, via the first merchant device 551, may set quantity discount thresholds, for example to correspond to quantities set in a previous step 604. For example, the merchant, via the first merchant device 551, may specify a discount rule of "purchase 5 of this item, get an extra 5% off", or discount thresholds that may be transparent to first consumer device 550, such as "accept offers of at least 75% if the first consumer device 550 is requesting to purchase five or more items", or other such configurations. In this regard, for each discount threshold, an LAO 610 will be calculated for each product identifier based on the threshold level. In some example embodiments, the Analytics engine 522 may analyze the discount thresholds set by the merchant and purchase requests of products by the customer. The Analytics engine 522 may simulate "what-if" scenarios using information of the discount thresholds and the purchase requests. The Analytics engine 522 may learn a behavior pattern 573, such as a merchant pricing pattern, of the merchants and the customers based on the one or more ML models (as described with reference to FIG. 5B). The behavior pattern 573 may be used in the simulated "what-if" scenarios to predict chances that the customer will purchase products from the merchant. For instance, the behavior pattern 573, may predict probability of accepting a discount threshold offered to the customer by the merchant. The probability may be provided as the offer pattern data 546 to the discount optimization manager 510 for calculating a corresponding LAO of each product identifier. Further, the LAO is provided to the first merchant device 551 via the merchant interface 520.

In a next step 606, the merchant, via the first merchant device 551, may set product details such as various descriptions for an item, for example technical specifications for electronics or appliances, or various descriptive texts to be presented to a consumer while browsing via the first consumer device 550. In some example embodiments, the product details may be stored in the product database 530. These product details may be accessed and analyzed by the Analytics engine 522 from the product database 530. Operation may continue in an iterative or looping fashion, repeating back at a previous step 602 and enabling the first merchant device 551 to continue configuring a plurality of additional items, discount thresholds, or quantity thresholds as desired.

In an embodiment, an LAO 610 for each product identifier may be dynamically changed with an LAO offset 626. The LAO offset 626 automatically modifies the LAO 610 for each consumer device 550 such that the plurality of consumer devices 550 will never receive the same LAO for a product identifier and/or bundle. It can be appreciated by one with ordinary skill in the art that in the circumstance where a consumer, via the consumer device 550 may deduce the LAO 610 for a product identifier and/or bundle, if she advertises the LAO to other users of system 501, the LAO 610 will not be the same for other users, thus rendering the information inaccurate and thus maintaining the integrity and utility of bundle-type checkout system 501 incorporating the subscription tiers 536. For example, the LAO offset 626 may be calculated for the first consumer device 550 using at least a location specific data (e.g., Massachusetts, Washington, Oregon, etc.) combined with, for example, a time of day (e.g., weekday, a weekend, a pay day, etc.) for a purchase made by the first consumer device 550, combined with, for example, a temperature (e.g., −15° C., 30° C., or the like) for the location of first consumer device 550. It should be appreciated that any information specific to the first consumer device 550 may be useful in calculating the LAO offset 626. In one example scenario, the first consumer device 550 may purchase a product identifier and/or bundle from a location, say Washington on Friday when temperature at Washington is 15° C. The location of purchase made from Washington may impact pricing or shipping charges of the product identifier/bundle due to factors like consideration of tax (e.g., 5% tax charge), distance of the location for the shipping, or the like. Also, the purchase made of Friday may fall on a "happy sale" time and the temperature 15° C. may contribute amount or rate of discount for the product identifier/bundle. Accordingly, the shipping charges can be dynamically calculated. In some embodiments, the shipping charges may be dynamically calculated based on the pricing pattern 548 of the historical data. For example, a consumer has ordered a product where the procurement of the product is taking place from a region which is geographically far away from a shipping location of the product. In such a case the shipping charges may vary based on distance between the location of procurement of the product and the shipping location. To that end, a pattern of the historical data can be analyzed by the Analytics engine 522, where the pattern may include different shipping locations of consumers and procurement locations of different products. Based on a distance between the procurement location and the shipping location, the shipping charges may be calculated. In other embodiments, each of the merchants can include a plurality of merchant shipping locations or warehouses that can ship products associated with the product identifiers to different customer locations. The calculation and derivation of pricing rules can also include shipping costs values of different subsets of the products. The shipping costs can be based on time, location, temperature, shipping rules, shipping tiers, weather, shipping duration, thermal capacity, carrier, destination location, taxes, tolls, and other transportation and shipping factors that can affect perishable and non-perishable products.

In some embodiments, the information of location, time and temperature may used for a LAO offset 626 calculation. For instance, the LAO offset 626 may be calculated as 20% based on the location data (i.e., Washington), carrier data, the time data (i.e., happy sale of Friday) and the temperature data (i.e., 15° C.). In another example scenario, when a second consumer device 550 purchases the same product identifier/bundle, the LAO 610 of the same product identifier/bundle may differ due to a dynamically updated LAO offset 626.

The LAO offset 626 may be dynamically updated based on location, time and temperature data of the second consumer device 550. For instance, the second consumer device 550 may purchase the same product identifier/bundle from a different location, e.g., Oregon on Monday when temperature is 10° C. In Oregon, price or shipping charges may differ from that of other location, such as Washington. On Monday, there may be no offer or no sale availability and rate for discount of the product identifier/bundle may be based on the temperature 10° C. of Oregon. In such scenario, the LAO offset 626 may be updated as 10% for the same product identifier/bundle purchased by the second consumer device 550. As such, a different LAO would be calculated for the same product identifier and/or bundle for every consumer device 550. In this regard, since second consumer device 550 which may be in another location or purchasing at another time-of-day than the first consumer device 550, the LAO prices 610 would appear to be seemingly random preventing any communication of LAOs for the product identifiers 542 and/or bundles by users of the system 501.

In some embodiments, the LAO 610 may be dynamically changed based on an updated pricing pattern 548. To that end, the Analytics engine 522 may analyze the latest historical data of a consumer and generate a pattern based on the analysis of the latest historical data. Such a pattern is the updated pricing pattern 548 that may be provided to the discount optimization manager 510 for dynamically changing the LAO 610. In some alternate embodiments, discount optimization manager 510 may dynamically change the LAO 610 based on the dynamically calculated shipping charges of a product identifier/bundle. The shipping charge for the product identifier/bundle may be dynamically calculated based on the analysis of updated historical data. This calculated shipping charges may be utilized to dynamically update corresponding LAO offset 626 of the product identifier/bundle and thereafter update the LAO 610 of the product identifier/bundle based on the updated LAO offset 626.

Figure 7:
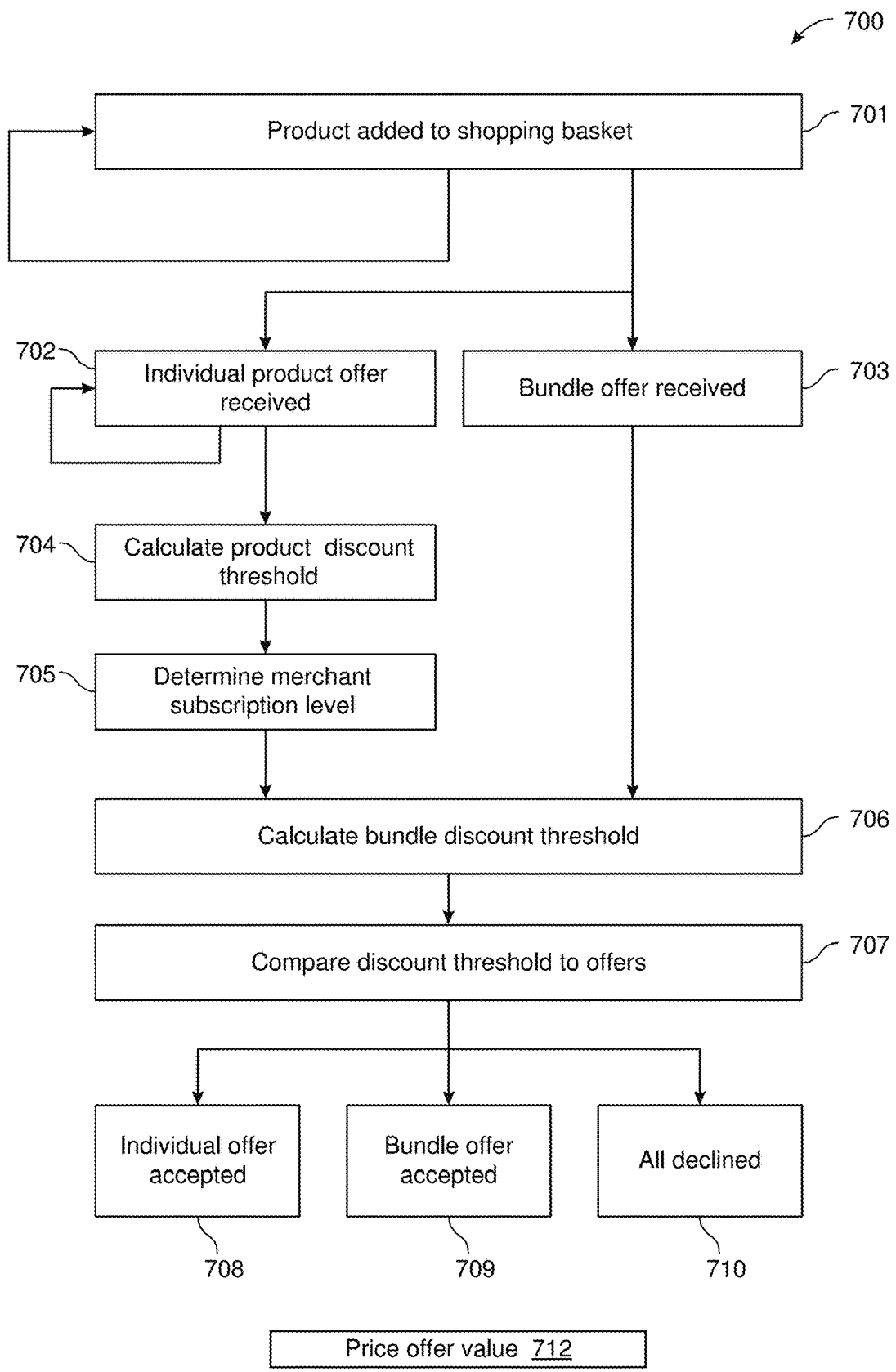
FIG. 7 is a flow diagram illustrating an exemplary method for operating a bundle-type checkout system incorporating subscription tiers, from the perspective of a first consumer.

FIG. 7 is a flow diagram illustrating an exemplary method 700 for operating a bundle-type checkout system, such as the checkout system 501 incorporating the subscription tiers 536, from the perspective of first consumer device 550. According to the embodiment, a consumer may browse and shop for items electronically via the first consumer device 550 using familiar means, such as a mobile computing device or an online storefront being browsed via a web browser computer. When a particular merchant or storefront has been configured according to a bundle-type checkout system according to the embodiment, additional functionality may be available, and may be made optionally visible or transparent to first consumer device 550 according to a particular arrangement (for example, the first consumer device 550 may not be informed of a product identifier's discount thresholds, or it may alternately be informed of specific discount thresholds or quantities to encourage purchasing by the user of the first consumer device 550, according to a vendor's preference during configuration).

In an initial step 701, a consumer, via the first consumer device 550, may add a product identifier to a digital "shopping basket", as is common in the art of electronic shopping. The product identifier can identify a physical product or a service.

In a next step 702, an individual product offer may be received by a checkout system, for example if first consumer device 550 has added only a single item to their basket and made a purchase offer for that item. Additionally, the first consumer device 550 may be used by a consumer to select a plurality of the product identifiers 542 to purchase as a bundle. If, for example, an offer is made, via the first consumer device 550, on multiple items but no bundle thresholds are met, operation may continue looping as illustrated, producing individual product offers for each individual item. In an alternate step 703, a bundle offer may be received from the first consumer device 550 by checkout system 501. Once a bundle is selected, a consumer may submit a single price offer value 712 for the bundle via first consumer device 550 to purchase the entire bundle. In some example embodiments, the bundle and the price offer value 712 for the bundle is received at the offer manager 512 of the system 501.

In some cases, the consumer may not know how much purchase offer can be made for the corresponding single item or the bundle. In such cases, the consumer may be guided with the purchase offer recommended by the Analytics engine 522. In particular, the Analytics engine 522 may analyze information related to the consumer and product details and learn the pattern from the analyzed information based on the one or more ML models. The pricing pattern 548 may provide a value corresponding to products (e.g., similar to the products purchased by the consumer) successfully sold with past availed offer values offered by the consumers. The Analytics engine 522 may generate the purchase offer, based on the pricing pattern 548, which may be provided to the first consumer device 550 via the consumer interface 521.

In a next step 704, the threshold calculator 513 may calculate product discount thresholds 568 corresponding to the product identifiers 542 for which offer values were received, and in a next step 705 the subscription manager 511 may determine a subscription tier for merchants offering the products. This can apply to both physical products and services. For example, the subscription tiers 536 may be bronze, silver, and gold which, in this regard, may indicate levels of subscriptions that, for example, may have different subscription costs associated and distinct associated discount rules applied. For example, a merchant may become a bronze subscriber at a lower cost than a silver subscriber, which in-turn is a lower cost than a gold subscriber. In some embodiments, there may be the product identifiers 542 designated as non-member tier product identifiers where the merchant may not be subscribed to a subscription tier.

In a next step 706, the discount optimization manager 510 may calculate the product discount thresholds 568 for items and bundles, taking into consideration a merchant's subscription tier to calculate an optimum discount for each item or bundle based on each participating merchant's subscription tier and configured discount thresholds. An exemplary process for calculating a weighted subscription tier discount is presented in FIG. 10.

In a next step 707, calculated discount thresholds may be compared against received offers (e.g., price offer values for bundles provided by consumers) from first consumer device 550, to determine how to proceed. If an offer for an item meets or exceeds a discount threshold for that item, the offer may be accepted in a final step 708. If an offer meets or is within a discount threshold for a bundle (for example, if an offer price for the entire shopping basket as a whole, i.e. the bundle, is received from the first consumer device 550, and it exceeds a bundle threshold based on the items in their cart considered together as a bundle rather than as separate individual items), then the offer may be accepted in a final step 709. If an offer exceeds any thresholds for items or bundles, it may be declined in a final step 710, resulting in the items and/or bundle not being available for purchase, optionally with a notification to the first consumer device 550, for example by sending a notification to the first consumer device 550 that the offer is not accepted for the item(s) and/or bundle in question.

In some embodiments, the first consumer device 550 may be given an opportunity to submit a new offer as may be appropriate. In another embodiment, the amount of offers available to the first consumer device 550 may be limited by the offer manager 512. For example, after three declined offers, the system 501 may not allow the first consumer device 550 to place additional offers, for example, for (i) the product identifiers 542 within the bundle, (ii) the bundle itself, (iii) until a pre-defined period of time has passed, or (iv) a combination of these. In some embodiments, an entirely new LAO is calculated for the product identifiers and/or bundle where different offers may be accepted or declined in certain circumstances. It should be appreciated that other restrictions may be placed on the product identifiers 542 and/or bundles when an offer is declined.

In some other embodiments, similar products sold by other merchants may be recommended to the first consumer device 550 as an alternative, when purchase of the items or bundles is declined. The recommendation 576 may be generated based on analysis of products in the product database 530 by the Analytics engine 522. Such recommended products may have more chances of being accepted at a price offer value 712 provided by a consumer of the first consumer device 550. To that end, the Analytics engine 522 may search for the products that may fall within the price offer value 712 provided by the consumer. In such cases, the Analytics engine 522 may determine the products from the product database 530 which match with the price offer value 712 provided by the consumer of the first consumer device 550. Accordingly, the consumer may have more options and flexibility, and abandonment of the shopping cart may be avoided.

FIG. 8 is an illustration of an exemplary graphical user interface 800 for a bundle-type checkout system incorporating the subscription tiers 536, showing the use of bundled price offers. According to the embodiment, a consumer who may be shopping electronically may select an item 801, via the first consumer device 550, to an electronic shopping cart, and may continue selecting additional items 802, 803. After adding a final item 803 to a shopping cart, a consumer may choose to "checkout" and complete a purchase, via the first consumer device 550, for the selected items. According to the embodiment, during checkout, the first consumer device 550 may be prompted to submit a price offer 810 for the bundle. For example, as illustrated the first consumer device 550 may have a variety of items in their cart such as furniture, household goods, appliances, or other products. An offer 810 may be submitted via the first consumer device 550 for the bundle as a whole, which may cover their entire shopping cart as illustrated. In such an arrangement, the offer 810 may be a single price (e.g., a price offer value 712) offered for all items within the bundle, and if accepted by the offer manager 512 (either manually or automatically, such as by comparison and matching against configured price thresholds (e.g., the product discount thresholds 568) as described previously), will result in a successful purchase for all included items in the bundle. In particular, the offer manager 512 may accept the price offer value 712 based on the price offer value 712 being less than or equal to the product discount threshold 568 for the bundle. In some embodiments, the offer manager 512 may decline the price offer value 712 for the bundle based on the price offer value 712 being greater than the product discount threshold 568 for the bundle.

Figure 10:
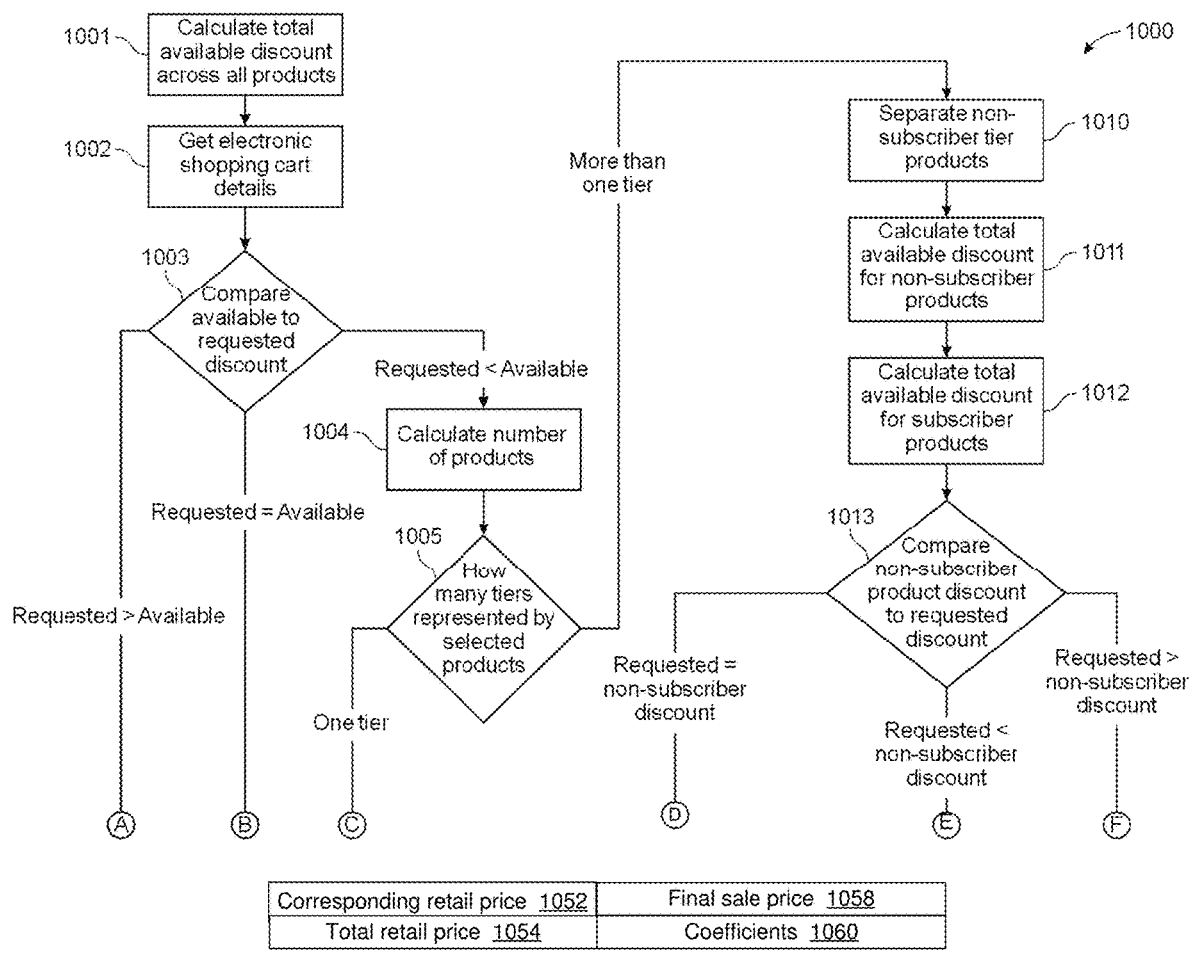
FIG. 10 is a flow diagram illustrating an exemplary method for weighted discount distribution based on subscription tier in a bundle-type checkout system incorporating subscription tiers.
Figure 10:
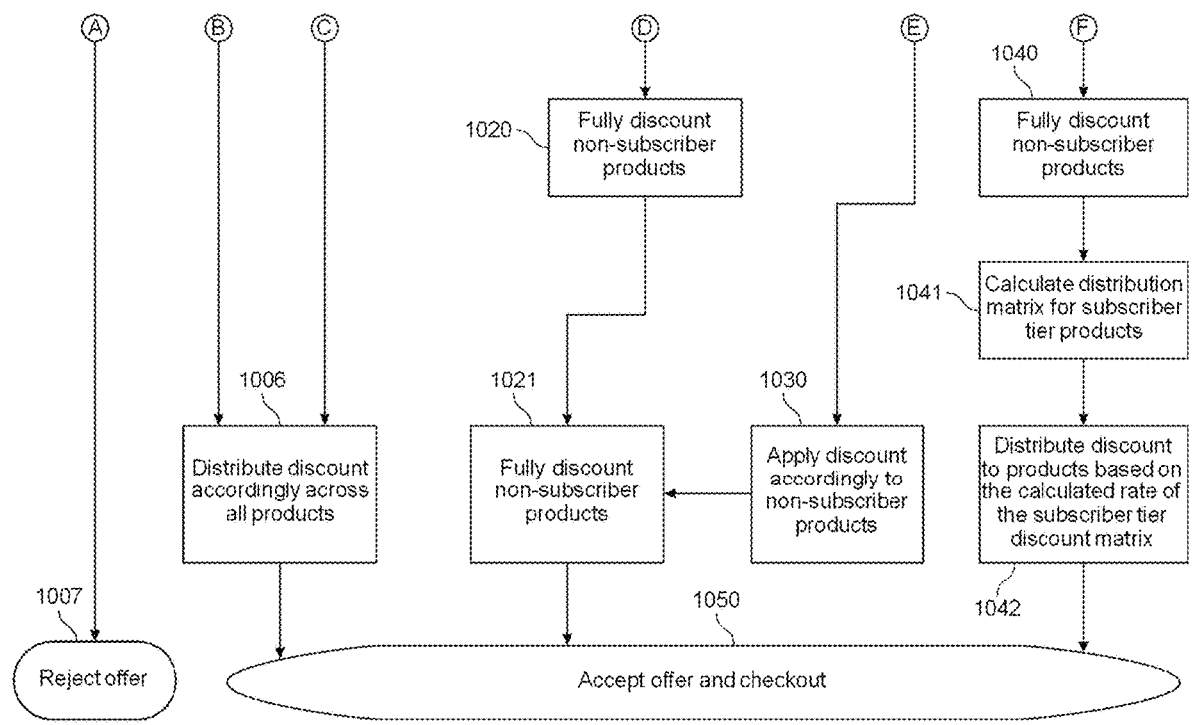

In some embodiments, the product identifiers 542 in the bundle are from a plurality of merchants previously configured through the plurality of merchant devices 551 wherein each merchant may be subscribed to a subscription tier further wherein the product identifiers 542 associated to each merchant may enjoy a smaller discount applied to their respective the product identifiers 542 as described in FIG. 10 (that is, if the proportional offer for the product identifiers 542 belonging to subscribed merchant is above the collective LAO, the product identifiers 542 belonging to subscribed merchants may be discounted at a lesser amount than the product identifiers 542 from merchant who may not have no subscription tier. Accordingly, the consumer, via the first consumer device 550, may then select to preview and confirm their offer, generally via interactive interface indicia such as, for example, a "preview my deal" button 820 or other interactive means.

Figure 9:
FIG. 9 is an illustration of an exemplary graphical user interface for a bundle-type shopping cart incorporating product bundles, illustrating the use of itemized price offers.

FIG. 9 is an illustration of an exemplary graphical user interface 900 for a bundle-type checkout system incorporating the subscription tiers 536, showing the use of itemized price offers. According to the embodiment, a consumer may add a plurality of items 901, 902, 903 via first consumer device 550 to an electronic shopping cart. During a checkout process, the consumer may input offer values to specify individual price offers 910, 911, 912 via the first consumer device 550 for each item, indicating an offer value on a per-item basis for the contents of their cart. The consumer may then preview 920 their offers via the first consumer device 550, to confirm the offer values and for which items the offer values are being made. Upon submission to checkout system 501, each offer may be considered individually against any discount thresholds for the items involved, and each item may be individually approved or denied by offer manager 512 without affecting other items. Optionally, the first consumer device 550 may be notified with an option to switch to a bundled price offer arrangement, if the first consumer device 550 has any qualifying bundles in their shopping basket (as described previously).

The illustrations of FIG. 8 and FIG. 9 are for representative purposes, and one of ordinary skill in the art would appreciate that any number of GUIs and other graphical representations that may be generated by system 501, and embodiments of the present invention are contemplated for use with any GUI type or form and the generation of any such graphical representation.

FIG. 10 is a flow diagram illustrating an exemplary method 1000 for weighted discount distribution based on subscription tier level. In an embodiment, a network-connected subscription tier discount distribution computer comprising at least a processor and a memory further comprising a plurality of programming instructions stored in the memory and operating on a processor, the programming instructions comprising a system to perform distribution of discounts to a plurality of consumer-selected product identifiers when purchased as a bundle is disclosed. It should be appreciated that a bundle may consist of only one product.

According to the embodiment, in an initial step 1001, the discount optimization manager 510 analyzes all the product identifiers 542 in an electronic shopping cart as selected by the first consumer device 550. The product identifiers 542 can be for physical products or services. In some example embodiments, the discount optimization manager 510 may analyzed the product identifiers 542 in the electronic shopping cart using the analytics engine 522. For each product identifier, the discount optimization manager 510 calculates the difference between an advertised retail price and an associated pre-configured LAO price 610. In some example embodiments, the LAO price 610 may be pre-configured based on the offer pattern data 546. The calculated amount is referred to as the "available discount" (that is, the total amount that a consumer may request as a discount on the bundle). Once all available discounts 566 are calculated for each product identifier, a "total available discount" is calculated by adding the individual available discount for each product identifier within the bundle. It should be appreciated that the plurality of the product identifiers 542 in the shopping cart may be selected by a consumer using the first consumer device 550 associated to a single merchant device 551 or associated to the plurality of merchant devices 551.

In a next step 1002, the discount optimization manager 510 identifies the product identifiers 542 within the shopping cart as selected by the first consumer device 550, receives a bundled offer from the first consumer device 550, that is, a single offer price entered by the consumer via the first consumer device 550 for the bundle, as, for example, described in FIG. 8.

In a next step 1003, the discount optimization manager 510 calculates a requested discount 564 by comparing a total retail price 1054 of all the product identifiers 542 within the bundle to the offer price (i.e., a price offer value 712 for the bundle) by the first consumer device 550. The total retail price 1054 for the bundle is a sum of the corresponding retail price 1052 associated to each product identifier in the bundle. The discount optimization manager 510 then calculates the difference between the requested discount 564 and the total available discount 538. If the requested discount 564 is greater than the total available discount 538, then the offer is rejected in a final step 1007 whereby notification of the rejected offer is sent to the first consumer device 550. In some alternate embodiments, the recommendations 576 of products similar to the rejected products may be provided to the first consumer device 550 upon rejection of the offer.

In some embodiments, the first consumer device 550 may be prompted, via consumer interface 521, to enter a new offer for the bundle. In some embodiments, the first consumer device 550 may be limited in the number of offers that may be made on a particular bundle. For example, discount optimization manager 510 may limit offers to a quantity of two rejected offers. In this regard after two rejected offers, discount optimization manager 510 may disable the ability for the first consumer device 550 to enter a third offer through consumer interface 521. For example, for a pre-specified amount of time, or for the current combination of the product identifiers 542 in the bundle. In another embodiment, a new LAO may be calculated for each product identifier within the bundle creating a new total LAO for the bundle as discussed previously.

Continuing with step 1003, if the requested discount 564 is equal to the total available discount, then the discount may be applied to all the product identifiers 542 (for example, to establish the selling price of each product identifier within the bundle at a selling price equal to the LAO price 610). If the requested discount 564 is less than the total available discount 538, a next step 1004 calculates the number of the product identifiers 542 in the bundle. For each product identifier in the bundle, the discount optimization manager 510 locates the product identifier in the product database 530 to identify an associated merchant device 551 and determines a subscription tier (for example, the subscription tiers 536 representing "gold", "silver", or "bronze" tiered merchants), if any, for associated merchant as may have been previously configured through subscription manager 511.

In a next step 1005, the discount optimization manager 510 computes the number of the subscription tiers 536 represented by all the product identifiers 542 within the bundle. If only one subscription tier is represented within the plurality of the product identifiers 542 in the bundle, then step 1006 distributes the requested discount 564 proportionally across all the product identifiers 542 an even fashion. For example, if the requested discount 564 is 10%, then 10% of the available discount 566 for each product identifier is set as the selling price for each product identifier and an overall 10% bundle price will be presented in step 1050. As such, an accepted offer is sent to the first consumer device 550 through consumer interface 521. In should be appreciated that in an embodiment, individual discounts available to the first consumer device 550 for the selected product identifiers are not visible to first consumer device 550, however, in another embodiment, consumer interface 521 may present product discount information for individual product identifiers to the first consumer device 550.

Referring again to step 1005, if the discount optimization manager 510 determines that there are more than one subscription tiers 536 represented from the bundled product identifiers, then step 1010 removes the product identifiers 542 associated to one or more merchant devices 551 who are identified as non-subscribers 622. In some embodiments, a non-subscribing merchant may still be categorized as a tier. In a next step 1011, the discount optimization manager 510 calculates a "first subtotal available discount" (hereinafter referred to as a non-subscriber total discount 620) for the product identifiers 542 associated to the non-subscriber tier 618. In a next step 1012 the discount optimization manager 510 calculates a "second subtotal available discount" (hereinafter referred to as a subscriber total discount 624) for the product identifiers 542 associated to one or more merchant devices 551 who are identified as subscribers as may have been preconfigured via subscription manager 511. The subscriber discount is calculated by subtracting the non-subscriber total discount from the requested discount 564.

In a next step 1013 the non-subscriber total discount is compared to the requested discount 564 by the discount optimization manager 510. If the requested discount 564 is equal to the non-subscriber total discount, then in step 1020, the requested discount 564 amount is evenly discounted from the product identifiers 542 associated with one or more non-subscribing merchant devices 551. That is a final sale price 1058 for the product identifiers 542 associated with non-subscribing members will be set at the LAO 610.

Further, no discount may be applied to the product identifiers 542 associated to merchants who have a subscription as preconfigured through the subscription manager 511 (that is, the price will be set at the retail price for the product identifiers 542 associated to merchants with a subscription) in step 1021. It can be appreciated that by being a subscriber of the bundle-type checkout system 501, a merchant can increase revenues in a bundled purchase scenario. Accordingly, in a next step 1050, the offer price is accepted and presented to the first consumer device 550 for purchase through the consumer interface 521.

Referring again to step 1013, if the requested discount 564 is less than the non-subscriber total discount, a percentage discount is calculated by the discount optimization manager 510 by dividing the requested discount 564 by non-subscriber total discount. The product identifiers 542 associated to the non-subscriber tier 618 are discounted by the calculated percentage (that is the final sale price 1058 for the product identifiers 542 associated with non-subscribing members will be set at the retail price minus the calculated percentage), in step 1030. Further, the final selling price for each product identifier is transmitted, via the discount optimization manager 510, to an associated merchant user device of the plurality of merchant user devices 551, based on a corresponding merchant device identifier 568 of the plurality of the merchant device identifiers 562. Furthermore, no discount is applied to the product identifiers 542 associated to merchants who have a subscription as may have been preconfigured through subscription manager 511 (that is, the price will be set at the retail price for the product identifiers 542 associated to merchants with a subscription) in step 1021.

Accordingly, in a next step 1050, the offer price is accepted and presented to the first consumer device 550 to confirm a purchase through the consumer interface 521.

Referring again to step 1013, based upon the requested discount 564 being greater than the non-subscriber total discount, then, in step 1040, a final selling price (e.g., the final sale price 1058 for each product identifier) is set at its respective LAO price 610 for each product identifier associated to one or more non-subscribing merchant devices 551. Furthermore, in step 1041, a final selling price for the product identifiers 542 associated to one or more merchant devices 551, who are subscribers, is based on a weighted discount matrix 534 based on the respective subscription tier associated to each product identifier (that is, for the product identifiers 542 associated to the plurality of merchant devices 551 that have subscribed to a particular subscription tier). It should be appreciated that a merchant who may pay for a higher-level subscription, may enjoy an automatic discount at a lower rate than merchants who pay for a lesser tier of subscription (or no subscription). The weighted discount matrix 534 holds a plurality of weighted discount values 1056 based on the subscription values 558 of the merchant device identifiers 562 associated to the plurality of merchant devices 551 (or the plurality of merchant devices 540). In some embodiments, the weighted discount values 1056, such as a discount percentage value In some embodiments, the weighted discount values 1056 of the weighted discount matrix 534 may be calculated based on a pre-defined number of the subscription tiers 536, the requested discount 564, and a pre-configured offset value. The pre-configured offset value may be calculated dynamically based on a plurality of the subscription tiers 536 using the pricing discount rules 616. The pricing discount rules 616 may be determined based on the pricing pattern derived from the analyzed historical data 552 of the Analytics engine 522. In some example embodiments, the weighted discount matrix 534 may be calculated recursively by calculating a plurality of coefficients 1060. Each coefficient 1060 of the plurality of coefficients 1060 may correspond to each subscription tier of the plurality of the subscription tiers 536 and coefficient offset by the pre-configured offset value. The pricing discount rules 616 can include discounts derived from the analyzed historical data 552 including time- and date-based discounts, volume discounts, product combination discounts, region-based discounts, nation-based discounts, subscription tier-based discount, and other similar discount types.

In an embodiment, a network-connected weighted discount distribution computer based on merchant subscription tiers, as pre-configured by the subscription manager 511, comprises at least a processor and a memory, further comprising a plurality of programming instructions stored in the memory and operating on a processor, the programming instructions adapted to calculating a matrix of discount values for weighted discounts is as follows:

Variable x may be an integer that sets the number of the subscription tiers 536. For example, x=5 represents that there are 5 subscription tiers.

Variable y is a total subscriber "total discount" value for all tier values combined. For example, y=150.50 is the value as calculated in step 1012.

Variable z is the percentage increase from each subscription tier to the next subscription tier. That is the difference in discount that will be applied to each tier. For example, where z=0.25 a second merchant device 551 who may have a higher subscription tier (for example, "gold level" versus "silver level", may enjoy a 25% reduction on a discount applied to their associated product identifiers within the bundle. In an embodiment, the distribution weighting is configurable by the discount optimization manager 510 through the admin console 541. In some embodiments, the percentage increase may be calculated dynamically for the particular bundle as selected by the first consumer device 550.

Step 1041 continues wherein in an embodiment, a ComputeWeightedDistributionByTiers function computes weighted discount distribution for x number of subscription tier groups as follows:

```
function ComputeWeightedDistributionByTiers (x, y, z)
    //initialize a matrix of size x * x with zeros
    pascal matrix[ ] = matrix(fill = 0, size = x * x)
    for i ← 1 to x do
        for j ← 1 to i do
            pascal matrix[i, j] ← choose(i−1, j−1)
        sum.coefficients[ ] ← colSums(pascal_matrix)
    // solve for xl such that xl = y/z_sum
    z_sum ← 0
    for i ← 1 to x do
```

-continued

```
z_sum ← z_sum + sum coefficients [i] * z^(i - 1)
xl ← round(y ÷ z_sum, 2)
//Compute final value of each x tier
solution[ ] ← matrix (fill = 0, size = 1 * x)
solution[i] ← xl
for i ← 2 to x do
    solution[i] ← solution[i - 1] * (z + 1)
//transform results to be percentages of y
solution ← round(solution ÷ y, 3)
    return (solution)
```

In an exemplary embodiment where there are three subscription tiers (e.g. x=3, wherein, for example, x1 represents a "Gold" subscription tier, x2 represents a "Silver" subscription tier, and x3 represents a "Bronze" subscription tier) a distribution of discount is calculated. A discount value for distribution (that is, a total discount to be applied to the subscription tiers 536), for example, as calculated by step 1012, may be, for example 555 (i.e. y=555, that is, the discount to be applied to the bundle of the product identifiers 542 is, for example, $555) and the rate at which the subscription tiers 536 are discounted is, for example, 45% (i.e. z=0.45, that is, each x subscription tier group is discounted at a rate of z more than the previous), and exemplary distribution of the discount as calculated by the ComputeWeightedDistributionByTiers function may be as follows:

TABLE 1

| Subscription Tier | Discount rate |
|---|---|
| Gold (i.e. x1) | 0.22 |
| Silver (i.e. x2) | 0.319 |
| Bronze (i.e. x3) | 0.462 |

In step 1042, distributed discounts based on the computed discount levels using the function ComputeWeightedDistributionByTiers are applied to corresponding the product identifiers 542 within the bundle of the product identifiers 542. Accordingly, the product identifiers 542 within the bundle associated to merchants with a subscription tier corresponding to a first x value (i.e. "Gold") will be discounted at 22%, the product identifiers 542 within the bundle associated to merchants with a subscription tier corresponding to a second x value (i.e. "Silver") will be discounted at 31.9%, the product identifiers 542 within the bundle associated to merchants with a subscription tier corresponding to a third x value (i.e. "bronze") will be discounted at 46.2%. It can be appreciated by one with ordinary skill in the art that by the weighted discount matrix distribution in such a fashion may enable new sources of income for a service provider of the system 501 through subscription fees, for example, by charging a different subscription fee that would generate a lesser discount on the product identifiers 542 for that merchant. In a system where a consumer may bundle product identifiers and provide a purchase offer such a system would generate increased revenue, both from increased sales by attracting consumers who may provide "offer prices" on bundled product identifiers and/or by generating a new stream of income by charging for subscriptions.

In an exemplary embodiment where there are four subscription tiers (e.g. x=4), the distribution of discount is calculated by step 1012 may be, for example 1000 (i.e. y=1000) and the rate at which the subscription tiers 536 are discounted is, for example, 25% (i.e. z=0.25), and exemplary distribution of the discount as calculated by the ComputeWeightedDistributionByTiers function would be as follows:

TABLE 2

| Subscription Tier | Discount rate |
|---|---|
| x1 | 0.173 |
| x2 | 0.217 |
| x3 | 0.271 |
| x4 | 0.339 |

In step 1042, distributed discounts based on the computed discount levels using the function ComputeWeightedDistributionByTiers would be applied to the bundled product identifiers based on subscription tier level. Accordingly, the product identifiers 542 within the bundle associated to merchants with a subscription tier corresponding to a first x tier will be discounted at 17.3%, the product identifiers 542 within the bundle associated to merchants with a subscription tier 1 corresponding to a second x tier will be discounted at 21.7%, the product identifiers 542 within the bundle associated to merchants with a subscription tier corresponding to a third x tier will be discounted at 27.1%, the product identifiers 542 within the bundle associated to merchants with a subscription tier corresponding to a fourth x tier will be discounted at 33.9%.

In an exemplary embodiment where there are nine subscription tiers (e.g. x=9), the distribution of discount is calculated by step 1012 may be, for example 75 (i.e. y=75) and the rate at which the subscription tiers 536 are discounted is, for example, 10% (i.e. z=0.10), and exemplary distribution of the discount as calculated by the ComputeWeightedDistributionByTiers function would be as follows:

TABLE 3

| Subscription Tier | Discount rate |
|---|---|
| x1 | 0.074 |
| x2 | 0.081 |
| x3 | 0.089 |
| x4 | 0.098 |
| x5 | 0.108 |
| x6 | 0.119 |
| x7 | 0.13 |
| x8 | 0.143 |
| x9 | 0.158 |

In step 1042, distributed discounts based on the computed discount levels using the function ComputeWeightedDistributionByTiers would be applied to the bundled product identifiers based on subscription tier level. Accordingly, the product identifiers 542 within the bundle associated to merchants with a subscription tier corresponding to a first x tier will be discounted at 7.4%, the product identifiers 542 within the bundle associated to merchants with a subscription tier corresponding to a second x tier will be discounted at 8.1%, the product identifiers 542 within the bundle associated to merchants with a subscription tier corresponding to a third x tier will be discounted at 8.9%, the product identifiers 542 within the bundle associated to merchants with a subscription tier corresponding to a fourth x tier will be discounted at 9.8%, the product identifiers 542 within the bundle associated to merchants with a subscription tier corresponding to a fifth x tier will be discounted at 10.8%, the product identifiers 542 within the bundle associated to merchants with a subscription tier corresponding to a sixth x tier will be discounted at 11.9%, the product identifiers 542 within the bundle associated to merchants with a subscription tier corresponding to a seventh x tier will be discounted at 13%, the product identifiers 542 within the bundle associated to merchants with a subscription tier corresponding to a eighth x tier will be discounted at 14.3%, the product identifiers 542 within the bundle associated to merchants with a subscription tier corresponding to a ninth x tier will be discounted at 15.8%. It should be appreciated by one with ordinary skill in the art, that any number of the subscription tiers 536 may be computed to satisfy varying business needs. For example, in a scenario where there are high volume sales, a more granular distribution may provide a better arrangement from a business perspective.

In a final step 1050, the offer price is accepted and presented to the first consumer device 550 for purchase confirmation through the consumer interface 521.

In some embodiments, the Analytics engine 522 may calculate a dynamic subscription price based on analysis of historical revenue performance from the historical database 532. That is, a customized subscription price may be computed for a given merchant to calculate what a potential revenue figure may have been had the merchant been at a particular subscription tier level, for example, to entice the merchant to, for example, sign up for a subscription (if the merchant was a non-subscriber), or to upsell the merchant to a higher subscription tier (if the merchant was already a subscriber). In this regard, the dynamic subscription price may be proportional to the computed savings for the merchant based on a "what-if" scenario if previous product identifiers (sold by the merchant) had been discounted at each available subscription tier. In some embodiments, Analytics engine 522 may propose new subscription tiers to maximize profit (for example, from subscription revenues) for the operator of system 501 and/or for the merchant. In other embodiments, the subscription tier can be changed dynamically after the bundle has been specified. Based on the condition or price of changing the subscription tier, the subscription tier can be changed upward or downward to increase or decrease the associated discount levels. In yet other embodiments, the option to change the number of products ordered for a particular product identifier can be presented after receiving an initial bundle definition. Because the total retail price of the bundle can be changed by changing the number of a particular product identifier, the option to change the subscription tier can also be changed based on the total price.

In some embodiments, the bundle can include a plurality of subsets of the product identifiers where two or more of the subscription tiers may apply to the bundle. In an illustrative example, the bundle may have some items that received discounts or pricing rules based on one subscription tier while other items in the bundle by receive discounts or pricing rules based on a different one of the subscription tiers. This can include conditions where an automatic change in the subscription tier can be offered to a consumer for different reasons. These automatic changes in the subscription tiers can be encoded in the pricing rules associated with the merchant or the consumer. In another illustrative example, a first subscription tier can be applied to the first 10 items in the bundle and a second subscription tier can be applied to the remaining items in the bundle. Alternatively, one subscription tier can be applied to a portion of the bundle until a subscription tier threshold value is reach and then another subscription tier can be applied to the rest of the bundle. Thus, the first subscription tier applied to the first $100 and the second subscription tier can apply to the remainder of the bundle. This can provide a bonus subscription price for an increase in total bundle price. In yet other embodiments, the consumer can provide a coupon code that can override the existing configuration and change the subscription tier based on the terms of the coupon code. The coupon code can be dynamically generated or pre-defined. The code code can include parameters that can specify a subscription tier to be used when the coupon code is provided. This can provide an override feature to directly set the subscription tier for the bundle or portion of the bundle. The coupon code can be applied to a single order or can be applied to as many transactions as specified by the parameters of the coupon code.

The skilled person will be aware of a range of possible modifications of the various embodiments described above. Accordingly, the present invention is defined by the claims and their equivalents.

What is claimed is:

1. A bundle-type checkout system comprising:
   an offer manager configured to:
      receive a bundle of product identifiers and a price offer value for the bundle from a consumer device at checkout;
   a discount optimization manager configured to:
      calculate a least acceptable offer price for each product identifier in the bundle based on a pricing pattern derived from analyzed historical data retrieved from a historical database, the analyzed historical data including unsuccessful offer data, and the least acceptable offer price is determined based on offer pattern data; and
         wherein the offer pattern data corresponds to a derived pattern from the analyzed historical data comprising unsuccessful offer data, historical sales information for the plurality of product identifiers, historical bundle offer information for the bundle, information of a plurality of subscription values of a plurality of merchant device identifiers associated to a plurality of merchant user devices;
      calculate a total available discount for the bundle based on a difference between the least acceptable offer price for each product identifier and a corresponding retail price for each product identifier in the bundle;
      calculate a requested discount for the bundle based on a difference between a total retail price for the bundle and the price offer value, wherein the total retail price is the sum of all of the corresponding retail price associated with each product identifier in the bundle;
      calculate a weighted discount value for each product identifier in the bundle based on a subscription tier associated with a merchant user device and the product identifier;
      calculate a final sale price for each product identifier in the bundle based on the weighted discount value;
      updating the historical database with the final sale price for each product identifier in the bundle; and
      transmit the final sale price for each product identifier to an associated merchant user device based on a corresponding merchant device identifier; and
   an analytics engine configured to:
      recalculate the subscription tiers based on a merchant pricing pattern learned from the updated historical database, the subscription tiers having the weighted discount value associated with the subscription tiers, the weighted discount values configured to satisfy forecast sales levels of the product identifiers based on the subscription tiers.

2. The system of claim 1, wherein the offer manager is further configured to:
decline the price offer value based on the price offer value being greater than the product discount threshold for the bundle; and
accept a price offer value based on the price offer value being less than or equal to the product discount threshold for the bundle.

3. The system of claim 2, further comprising an analytics engine configured to generate recommendations for alternative products identifiers based on the declination of the price offer value and sending the recommendations to the consumer device.

4. The system of claim 2, further comprising an analytics engine configured to generate recommendations for an alternate subscription tier based on the declination of the price offer value and sending the recommendations to the consumer device.

5. The system of claim 1, wherein the offer manager is further configured to compare a price offer value with a product discount threshold for the bundle.

6. A system, comprising:
a network-connected bundle-type checkout computer comprising a plurality of programming instructions stored in a memory and operating on a processor, the programming instructions configured to operate a bundle-type checkout system comprising:
an offer manager configured to:
receive, from a consumer device, a subset of a plurality of product identifiers as a bundle and a price offer value for the bundle;
a discount optimization manager to:
calculate a least acceptable offer price associated to each product identifier of the subset of the plurality of product identifiers in the bundle based on a pricing pattern derived from analyzed historical data retrieved from a historical database, the analyzed historical data including unsuccessful offer data;
wherein the least acceptable offer price is determined based on offer pattern data; and
wherein the offer pattern data corresponds to a derived pattern from analyzed historical data comprising unsuccessful offer data, historical sales information for the plurality of product identifiers, historical bundle offer information for the bundle, information of a plurality of subscription values of a plurality of merchant device identifiers associated to a plurality of merchant user devices;
calculate a total available discount for the bundle based at least in part on:
the least acceptable offer price associated to each product identifier in the bundle; and
a corresponding retail price associated to each product identifier in the bundle;
calculate a requested discount for the bundle based at least in part on a total retail price for the bundle and the price offer value;
wherein the total retail price for the bundle is the sum of the corresponding retail price associated to each product identifier in the bundle;
calculate a weighted discount matrix based on the requested discount being less than the available discount for the bundle;

wherein the weighted discount matrix holds a plurality of weighted discount values based at least in part on a plurality of subscription values; and
wherein each weighted discount value of the plurality of weighted discount values corresponds to an associated subscription tier for each merchant user device associated to each product identifier within the bundle;
assign a weighted discount value, from the plurality of weighted discount values, for each product identifier within the bundle;
calculate a final sale price for each product identifier within the bundle based at least in part on the weighted discount value;
updating the historical database with the final sale price for each product identifier in the bundle; and
transmit the final sale price, for each product identifier to an associated merchant user device of the plurality of merchant user devices, based on a corresponding merchant device identifier of the plurality of merchant device identifiers; and
an analytics engine configured to:
recalculate the subscription tiers based on a pricing pattern learned from the updated historical database, the subscription tiers having the weighted discount value associated with the subscription tiers, the weighted discount values configured to satisfy forecast sales levels of the product identifiers based on the subscription tiers.

7. The system of claim 6, wherein the plurality of weighted discount values of the weighted discount matrix is calculated based at least in part on a pre-defined number of subscription tiers, the requested discount and a pre-configured offset value.

8. The system of claim 7, wherein the wherein the pre-configured offset value is calculated dynamically based at least in part on a plurality of subscription tiers using pricing discount rules and wherein the pricing discount rules are determined based on the derived pattern from the analyzed historical data.

9. The system of claim 8, wherein the weighted discount matrix is calculated recursively by calculating a plurality of coefficients and each coefficient of the plurality of coefficients corresponds to each subscription tier of the plurality of subscription tiers and coefficient offset by the pre-configured offset value.

10. The system of claim 1, wherein the discount optimization manager is configured to:
calculate a plurality of weighted discount values for each subscription tier of a plurality of subscription tiers; and
update the weighted discount matrix based on the plurality of weighted discount values.

11. A computer-implemented method, comprising:
receiving, from a consumer device a bundle of product identifiers and a price offer value for the bundle;
calculating, at a discount optimization manager, a least acceptable offer value associated to each product identifier in the bundle based on offer pattern data corresponding to a derived pattern from analyzed historical data retrieved from a historical database including unsuccessful offer data;
calculating, at the discount optimization manager, a total available discount for the bundle based on a difference between the least acceptable offer price for each product identifier and a corresponding retail price for each product identifier in the bundle;

calculating, at the discount optimization manager, a requested discount for the bundle based on a difference between a total retail price for the bundle and the price offer value, wherein the total retail price is the sum of all of the corresponding retail price associated with each product identifier in the bundle;

calculating, at the discount optimization manager, a weighted discount value from the plurality of weighted discount values for each product identifier within the bundle;

calculating, at the discount optimization manager, a final sale price for each product identifier within the bundle based at least in part on the weighted discount value;

updating, at the discount optimization manager, the historical database with the final sale price for each product identifier in the bundle;

transmitting, at the discount optimization manager, the final sale price, for each product identifier to an associated merchant user device based on a corresponding merchant device identifier; and recalculating, at an analytics engine, the subscription tiers based on a pricing pattern learned from the updated historical database, the subscription tiers having the weighted discount value associated with the subscription tiers, the weighted discount values configured to satisfy forecast sales levels of the product identifiers based on the subscription tiers.

12. The computer-implemented method of claim 11, further comprising:
declining, at the offer manager, the price offer value based on the price offer value being less than the product discount threshold for the bundle; and
accepting, at the offer manager, the price offer value based on the price offer value being greater than or equal to the product discount threshold for the bundle.

13. The computer-implemented method of claim 12, further comprising:
generating, at an analytics engine, recommendations for alternate products identifiers based on the declination of the price offer value and sending the recommendations to the consumer device.

14. The computer-implemented method of claim 12, further comprising:
generating, at an analytics engine, recommendations for an alternative subscription tier based on the declination of the price offer value and sending the recommendations to the consumer device.

15. The computer-implemented method of claim 11, further comprising:
receiving, from the consumer device at an offer manager, the plurality of selected product identifiers corresponding to the subset of the plurality of product identifiers; and the price offer value for the bundle; and
comparing, at the offer manager, the price offer value with a product discount threshold for the bundle.

16. The computer-implemented method of claim 11, wherein:
the weighted discount matrix is calculated based on a subscription tier associated with a merchant user device and the product identifier, the weighted discount matrix with a plurality of equal discount values, based upon the requested discount being equal to the total available discount; and
the plurality of equal discount values is the plurality of weighted discount values having equal values.

17. The computer-implemented method of claim 16, wherein the plurality of weighted discount values of the weighted discount matrix is calculated based at least in part on a pre-defined number of subscription tiers, the requested discount and a pre-configured offset value.

18. The computer-implemented method of claim 17, wherein the pre-configured offset value is calculated dynamically based at least in part on a plurality of subscription tiers using pricing discount rules and wherein the pricing discount rules are determined based on the derived pattern from the analyzed historical data.

19. The computer-implemented method of claim 13, wherein calculating the weighted discount matrix includes recursively calculating the weighted discount matrix by calculating a plurality of coefficients wherein each coefficient of the plurality of coefficients corresponds to each subscription tier of the plurality of subscription tiers and coefficient offset by the pre-configured offset value.

20. The computer-implemented method of claim 11, further comprising:
calculating, at the discount optimization manager, a plurality of weighted discount values for each subscription tier of a plurality of subscription tiers; and
updating, at the discount optimization manager, the weighted discount matrix based on the plurality of weighted discount values.

* * * * *